(12) United States Patent
Brooks et al.

(10) Patent No.: US 9,458,825 B2
(45) Date of Patent: Oct. 4, 2016

(54) ACTUATION MECHANISMS FOR LOAD MANAGEMENT DEVICES ON AERODYNAMIC BLADES

(71) Applicant: Frontier Wind, LLC, West Conshohocken, PA (US)

(72) Inventors: Peter Everett Brooks, Rochester, MN (US); Nathan John Burgess, Rochester, MN (US); Myron Floyd Miller, West Lafayette, IN (US); Thomas Jay Green, Roseville, CA (US)

(73) Assignee: Frontier Wind, LLC, West Conshohocken, PA (US)

( * ) Notice: Subject to any disclaimer, the term of this patent is extended or adjusted under 35 U.S.C. 154(b) by 727 days.

(21) Appl. No.: 13/834,252

(22) Filed: Mar. 15, 2013

(65) Prior Publication Data

US 2014/0271192 A1 Sep. 18, 2014

(51) Int. Cl.
*B64C 9/00* (2006.01)
*F03D 7/02* (2006.01)
*F03D 1/06* (2006.01)

(52) U.S. Cl.
CPC ............ *F03D 7/022* (2013.01); *F03D 1/0675* (2013.01); *F03D 7/0256* (2013.01); *F03D 80/00* (2016.05);
(Continued)

(58) Field of Classification Search
CPC .... F03D 1/0675; F03D 7/022; F03D 7/0256; F03D 11/00; F05B 2240/122; F05B 2240/31; F05B 2260/507
USPC .......................................................... 416/23
See application file for complete search history.

(56) References Cited

U.S. PATENT DOCUMENTS

| 4,692,095 A | * | 9/1987 | Lawson-Tancred .. F03D 7/0252 416/23 |
| 5,127,605 A | | 7/1992 | Atchison et al. |

(Continued)

FOREIGN PATENT DOCUMENTS

| GB | 720591 A | 12/1954 |
| JP | 2003206847 A | 7/2003 |

(Continued)

OTHER PUBLICATIONS

Notice of Preliminary Rejection for Korean Patent Application No. 10-2014-0030134 mailed Dec. 30, 2014.
(Continued)

*Primary Examiner* — Nicholas J Weiss
*Assistant Examiner* — Ngoc T Nguyen
(74) *Attorney, Agent, or Firm* — Banner & Witcoff, Ltd.

(57) ABSTRACT

Systems, apparatuses, and methods are provided for actuating one or more load management devices on a wind turbine and/or a wind turbine blade. Each actuator may exhibit one or more beneficial qualities including appropriate actuation speed/force characteristics, size and/or weight characteristics, and/or increased reliability and consistent operation in a variety of operating conditions. According to some aspects, the actuator may be a direct pneumatic actuator, a ramp slide pneumatic actuator, a scissor actuator, a linear induction actuator, a belt actuator, a closed cam follower actuator, a screw drive actuator, a solenoid actuator, a rack and pinion actuator, a cylindrical cam follower actuator, a Y-belt actuator, an offset rotary drive actuator, a tape style actuator, a rigid tape actuator, a deformable membrane actuator, a memory alloy actuator, and/or a crank slide actuator.

20 Claims, 28 Drawing Sheets

(52) U.S. Cl.
CPC ...... *F05B 2240/122* (2013.01); *F05B 2240/31* (2013.01); *F05B 2260/507* (2013.01); *Y02E 10/721* (2013.01); *Y02E 10/722* (2013.01); *Y02E 10/723* (2013.01)

(56) References Cited

U.S. PATENT DOCUMENTS

| | | | | |
|---|---|---|---|---|
| 6,139,268 | A | * | 10/2000 | Murawski ............... F01D 5/141 416/23 |
| 8,387,924 | B2 | | 3/2013 | Gyuricsko et al. |
| 2008/0240923 | A1 | * | 10/2008 | Bonnet ................. F03D 1/0675 416/223 R |
| 2009/0284016 | A1 | * | 11/2009 | van Dam ................. F03D 1/06 416/87 |
| 2009/0285682 | A1 | * | 11/2009 | Baker ................... F03D 1/0675 416/23 |
| 2011/0110777 | A1 | | 5/2011 | Abdallah et al. |
| 2011/0223022 | A1 | * | 9/2011 | Wang ................... F03D 7/0252 416/23 |
| 2012/0269632 | A1 | * | 10/2012 | Westergaard ......... F03D 1/0641 416/159 |

FOREIGN PATENT DOCUMENTS

JP           2009137574 A     6/2009
WO           2011119365 A1    9/2011

OTHER PUBLICATIONS

Mar. 19, 2015 (CA) Office Action—App 2845936.
Mar. 17, 2015 (JP) Notification of Rejection—App 2014052920—Eng Tran.
European Search Report for application No. 14159284.0 mailed Aug. 5, 2014.

* cited by examiner

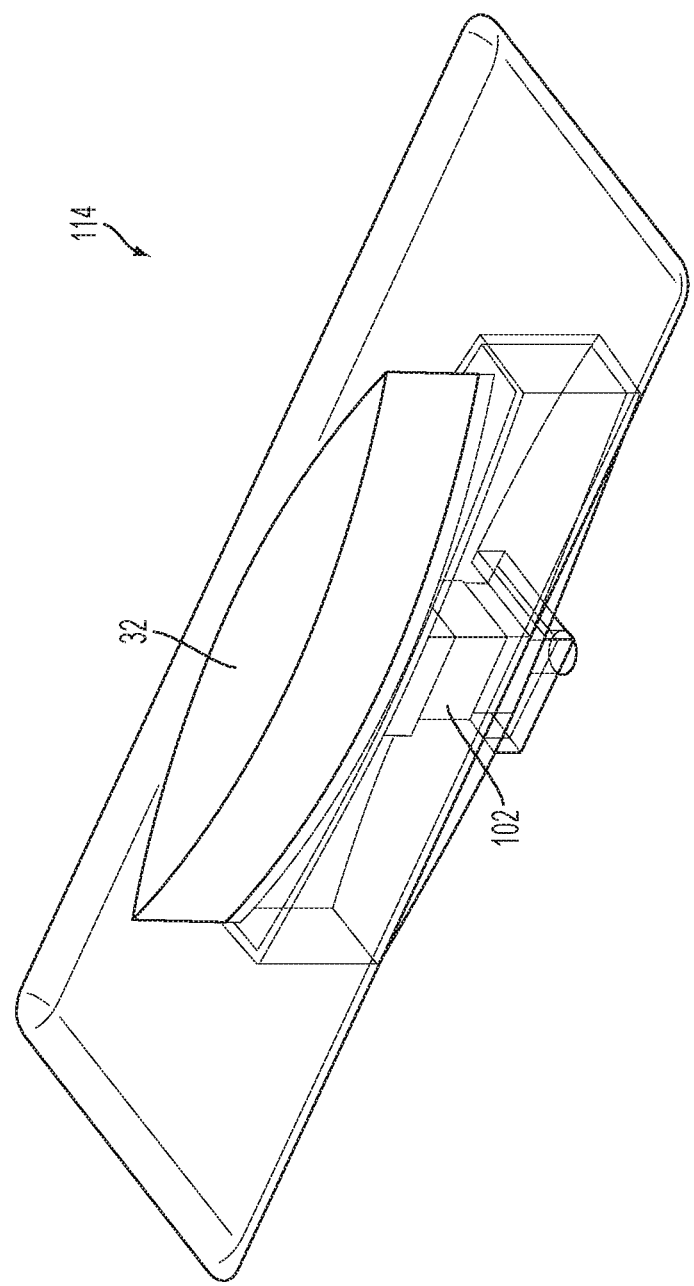

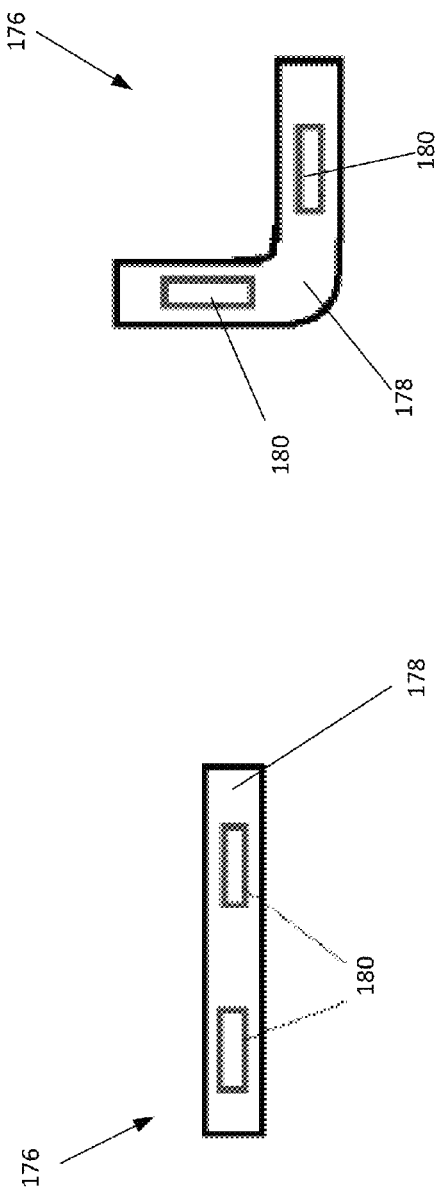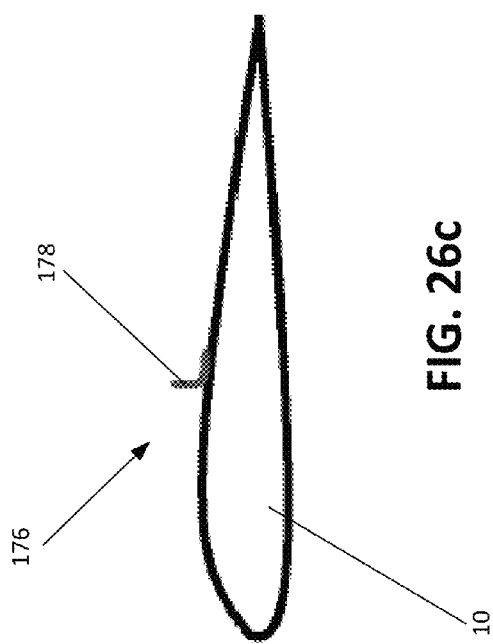
FIG. 26a
FIG. 26b
FIG. 26c

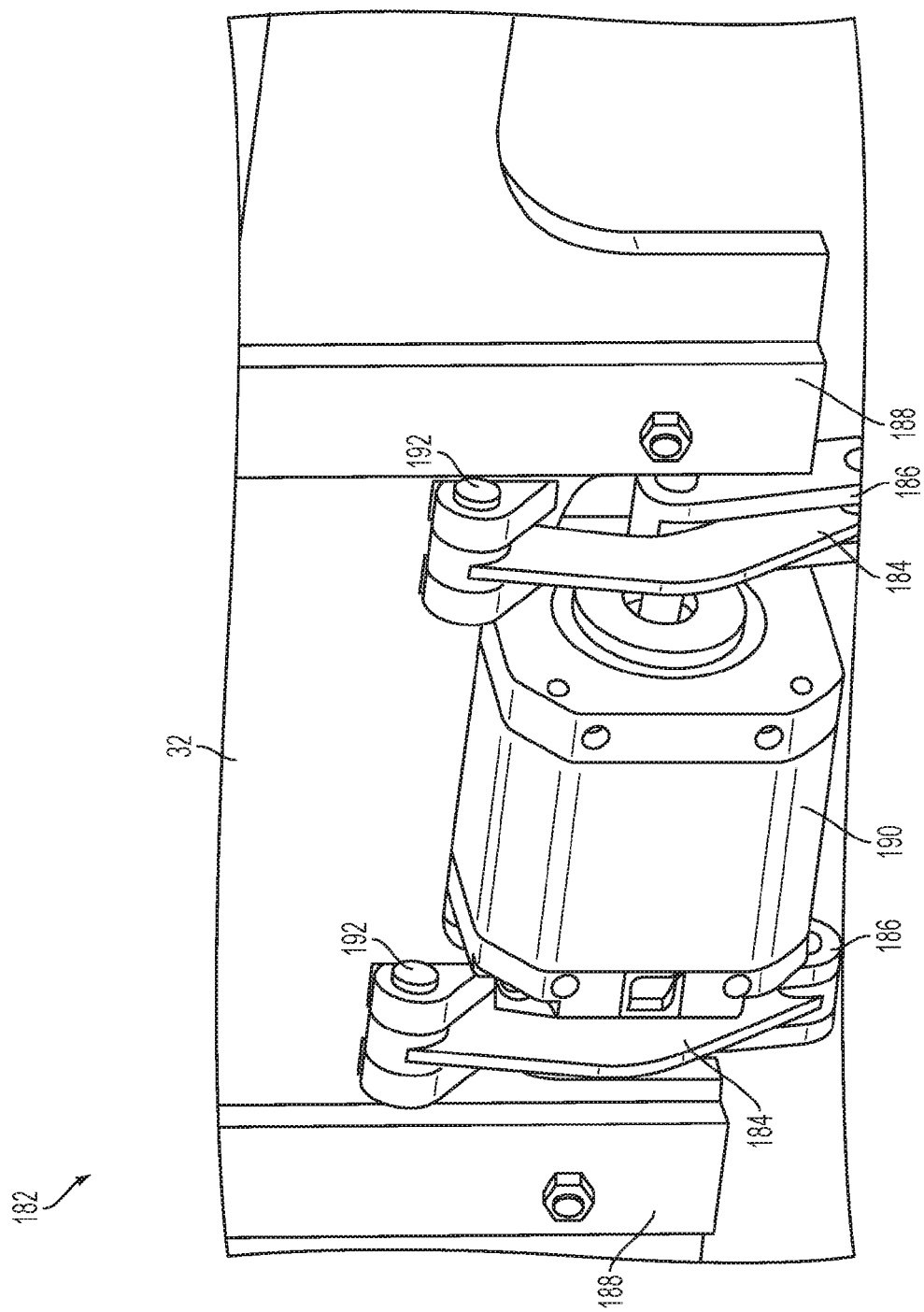

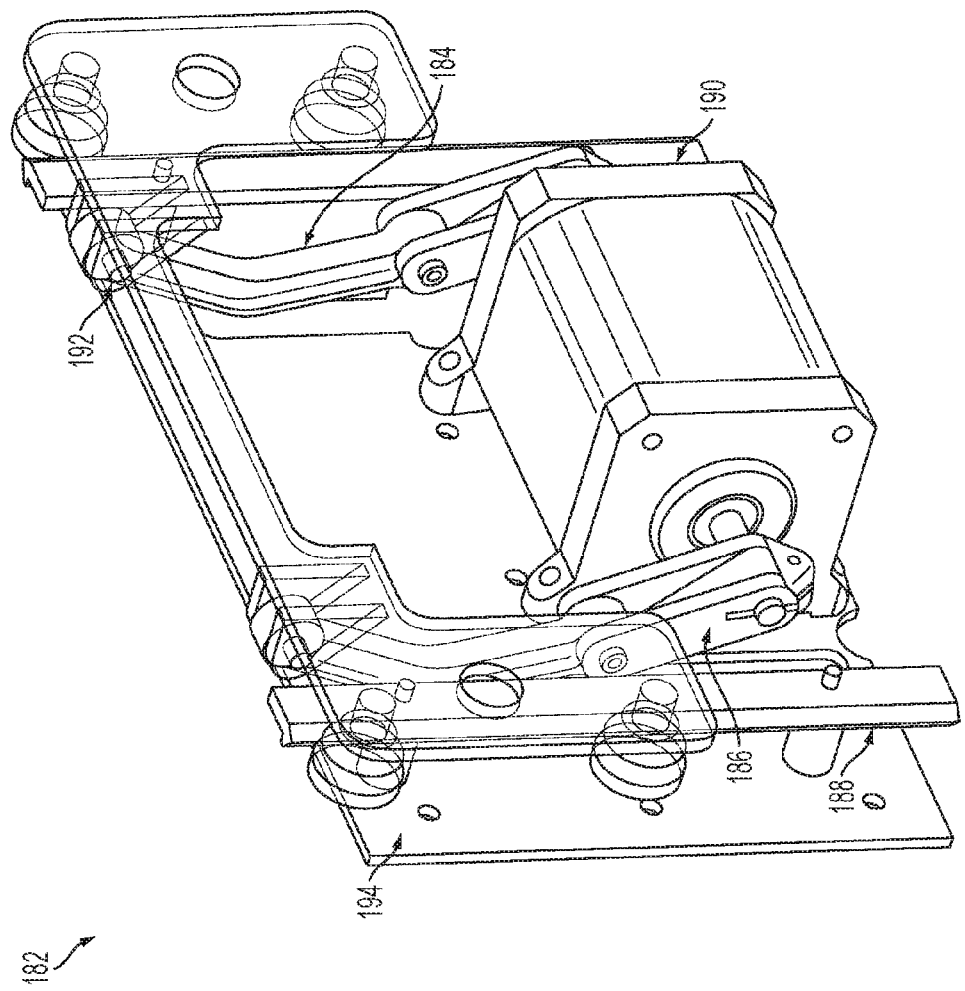

ACTUATION MECHANISMS FOR LOAD MANAGEMENT DEVICES ON AERODYNAMIC BLADES

TECHNICAL FIELD

This application relates generally to the design and control of a wind turbine. More particularly, some aspects of the invention relate to modifying the aerodynamics of a wind turbine.

BACKGROUND

With their decreased availability and adverse impact to the environment, fossil fuels and other conventional energy sources are continually declining in popularity while clean, renewable energy source have seen rapid growth. In the coming years, as these fossil fuels continue to become scarce and as knowledge regarding the environmental impact of such energy sources becomes available, the demand for clean, renewable energy will continue to increase. One such source of clean, renewable energy is wind power. For example, kinetic energy from wind may be transmitted into electricity using, e.g., a wind turbine. Accordingly, electricity may be produced without burning any of these costly, environmentally hazardous fossil fuels.

Wind turbines create power proportional to the swept area of their blades. Thus, by increasing the length (e.g., span) of wind turbine blades, more energy may be produced. However, the choice of rotor attributes for a wind turbine, such as its diameter, is a design trade-off between longer blades for more energy production in low winds and shorter blades for load limitation in high winds. A wind turbine having longer blades will increase the swept area, which in turn produces more power. But at high wind speeds, a wind turbine having longer blades places greater demands on the components and creates more situations where the turbine must be shut down to avoid damaging components. Even in situations where the average wind speed is not high enough to cause damage, periodic wind gusts may change both the speed and direction of the wind and apply forces that may be strong enough to damage equipment.

Approaches with varying levels of success have been attempted in achieving higher power, fewer shut downs, and less instances of damage to components. For example, pitch control has been used to vary the pitch of the blade (i.e., the angle of the blade). On a pitch controlled wind turbine, an electronic controller on the turbine checks the power output of the turbine. When the power output exceeds a certain threshold, the blade pitch mechanism turns the rotor blades to reduce the loads on the rotor blades. The blades are later turned back when the wind drops again. However, pitch control can be fairly slow to respond to changes in the wind and is relatively ineffective to loads imparted by sudden wind gusts.

Stall control is another approach that has been used in an attempt to achieve higher power, and to reduce shut downs and damage to components. In passive-type stall controlled wind turbines, the rotor blades are mounted to the hub at a fixed angular orientation. The stall control is achieved passively by the shape of the blade being such that the blade goes into aerodynamic stall (destroying lift) when the wind speed exceeds a certain threshold. Active-type stall controlled wind turbines exist. In such systems, the rotor blades are adjusted in order to create stall along the blade. However, both types of stall control systems can be difficult to optimize and slow to respond, and may suffer from lower predictability of results than desired. These drawbacks are magnified in conditions with erratic winds and wind gusts.

Variable length rotor blade systems have also been used as an attempt to achieve higher power, and experience fewer shut downs and less damage to components. In such systems, the wind turbine rotor blades are telescopic so that their length can be adjusted based on the wind speed. Such provides advantages in that the rotor blades can be extended to provide higher output in low wind conditions and retracted to lower loads in high wind conditions. U.S. Pat. No. 6,902,370, titled "Telescoping Wind Turbine Blade" and which is hereby incorporated by reference in its entirety, discloses a wind turbine system having telescoping wind turbine rotor blades. While variable length rotor blade systems have certain advantages, they may suffer drawbacks in erratic wind conditions or may be too slow to respond when experiencing a wind gust.

More recently, deflectors have been used to control loads on a wind turbine's components. For example, deflectors have been used to disrupt the airflow on a wind turbine blade thus reducing lift and the corresponding load placed on the wind turbine components. For example, U.S. Pat. No. 8,267,654, titled "Wind Turbine with Deployable Air Deflectors" and which is hereby incorporated by reference in its entirety, describes the use of deflectors on a wind turbine blade to control loads. These deflectors are deployed when a sensor or other component senses power production, speed, acceleration, loads, or the like has exceeded a threshold value, and the deflectors are thus deployed to bring the sensed power production, speed, acceleration, loads, etc. back within the threshold. In some instances, multiple deflectors are used on a wind turbine and/or a wind turbine blade to control loads. For example, in some embodiments, multiple deflectors are arranged along the length of a wind turbine blade. Accordingly, one or more of the multiple deflectors may be deployed to control load as discussed above.

However, in order to actuate these one or more air deflectors effectively, actuators must meet certain design characteristics. Because air deflectors may be actuated in response to a sudden change in operating conditions (e.g., a sudden wind gust or the like), actuators may need to be capable of actuating an air deflector quickly (in some embodiments, e.g., 100 ms or less) while delivering an appropriate force to actuate the air deflector (in some embodiments, e.g., 40N). Further, because a mounting space inside a wind turbine blade may be limited, actuators may need to be rather compact. Still further, because over the life of a system an air deflector may be actuated several million, or even hundreds of millions of times, in varying operating conditions, actuators may need to be reliable, resistant to changes in operating conditions, and/or be easily serviceable. Still further, and particularly in applications where multiple air deflectors (and thus actuators) are provided on a single blade, an actuator may need to be rather lightweight in order to, e.g., reduce the centripetal acceleration loading the actuator places the blade.

Thus, there remains a need to provide an actuator for a load management device on a wind turbine (e.g., an air deflector) which exhibits one or more of the above qualities. More particularly, there remains a need to provide an actuator which exhibits appropriate actuation speed/force characteristics, is compact and/or lightweight, and/or is reliable and capable of consistently operating in a variety of operating conditions.

BRIEF SUMMARY

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

One or more aspects of the invention provide an actuator for a load management device (e.g., an air deflector) exhibiting one or more of the discussed beneficial characteristics. For example, each actuator may exhibit one or more beneficial qualities for use on, e.g., a wind turbine blade, including appropriate actuation speed/force characteristics, size and/or weight characteristics, and/or increased reliability and consistent operation in a variety of operating conditions.

According to some aspects, a crank slide actuator is provided on a wind turbine blade for actuating one or more load management device. The crank slide actuator may comprise a motor, one or more crank arms coupled to the motor at a first end of the one or more crank arms, and one or more connecting links, wherein a first end of the one or more connecting links is pivotally coupled to a second end of the one or more crank arms, and wherein a second end of the one or more connecting links is pivotally coupled to the load management device, wherein when the motor turns in a first direction the load management device is configured to extend from a blade of a wind turbine, and wherein when the motor turns in a second direction opposite the first direction the load management device is configured to retract into the blade of the wind turbine.

According to other aspects, a wind turbine is provided comprising a hub and a plurality of load management assemblies connected to and arranged about the hub. At least one of the load management assemblies may comprise a crank slide actuator for actuating a load management device on the at least one of the wind turbine blades. In some embodiments, the crank slide actuator may comprise a motor, one or more crank arms coupled to the motor at a first end of the one or more crank arms, and one or more connecting links, wherein a first end of the one or more connecting links is pivotally coupled to a second end of the one or more crank arms, and wherein a second end of the one or more connecting links is pivotally coupled to the load management device, wherein when the motor turns in a first direction the load management device is configured to extend from a blade of a wind turbine, and wherein when the motor turns in a second direction opposite the first direction the load management device is configured to retract into the blade of the wind turbine.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 17 is a perspective view of a screw drive actuator configured to actuate one or more load management devices according to some aspects of the invention;

FIG. 26a is a front view of a memory alloy actuator in a retracted state according to some aspects of the invention;

FIG. 26b is a front view of the memory alloy actuator depicted FIG. 26a in an extended state;

FIG. 26c is a front view of the memory alloy actuator depicted in FIGS. 26a and 26b provided on a wind turbine blade and in an extended state;

FIG. 27a is a perspective view of a crank slide actuator configured to actuate one or more load management devices according to some aspects of the invention;

FIG. 27b is another perspective view of the crank slide actuator depicted in FIG. 27a;

FIG. 29b is a perspective view of the deformable shape actuator depicted in FIG. 29a;

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Aspects of the present invention are directed to actuation mechanisms for one or more load management devices provided on an aerodynamic blade. For example, aspects of the invention are directed to actuators configured to actuate one or more air deflectors disposed on a wind turbine blade.

Figure 1:
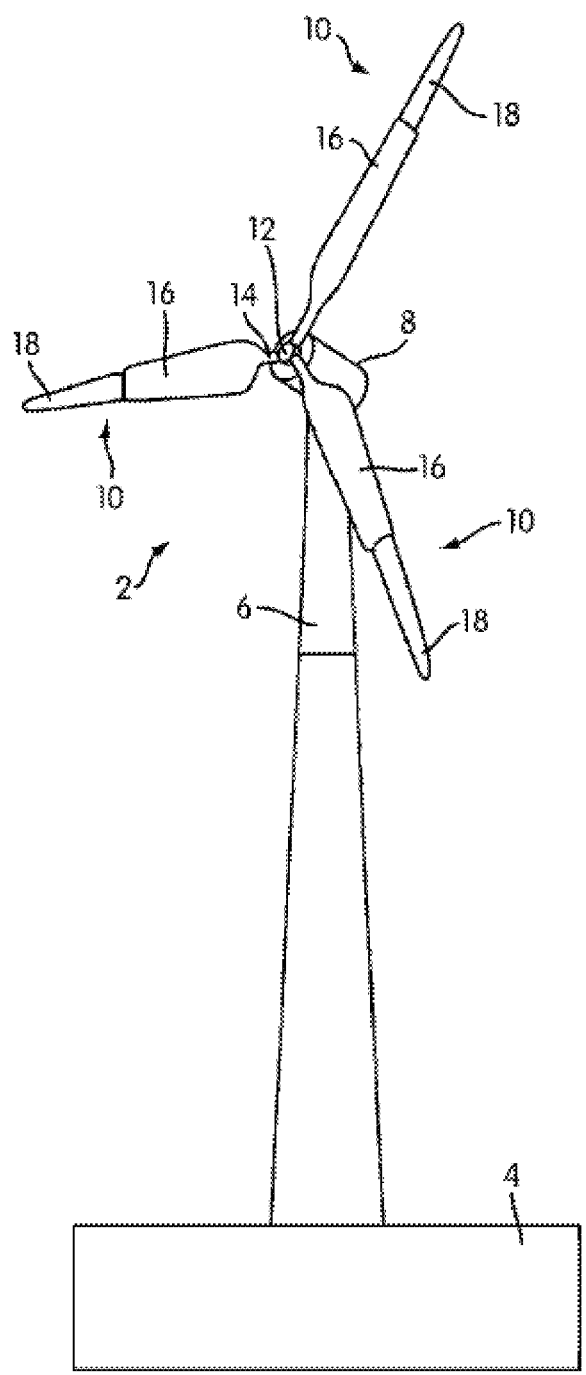
FIG. 1 is a perspective view of a wind turbine according to a first embodiment of the invention.

FIG. 1 shows a wind turbine 2 on a foundation 4 with a tower 6 supporting a nacelle 8. One or more blades 10 are attached to a hub 12 via a bolt flange 14. In the depicted embodiment, the wind turbine includes three blades 10. The hub 12 is connected to a gear box, a generator, and other components within the nacelle 8. The blades 10 may have a fixed length or may be of the variable length-type, i.e., telescopic, such as shown in FIG. 1. As shown in FIG. 1, each variable length blade 10 includes a root or base portion 16 and a tip portion 18. The tip portion 18 is movable with respect to the root portion 16 so as to controllably increase and decrease the length of the rotor blade 10, and in turn, respectively increase and decrease the swept area of the rotor blades 10. Any desirable drive system, such as a screw drive, a piston/cylinder, or a pulley/winch arrangement may be used to move the tip portion 18 with respect to the root portion 16. Such drive systems are described in U.S. Pat. No. 6,902,370 titled "Telescoping Wind Turbine Blade," which is hereby incorporated by reference in its entirety. The wind turbine 2 further includes a yaw drive and a yaw motor, not shown.

Figure 2:
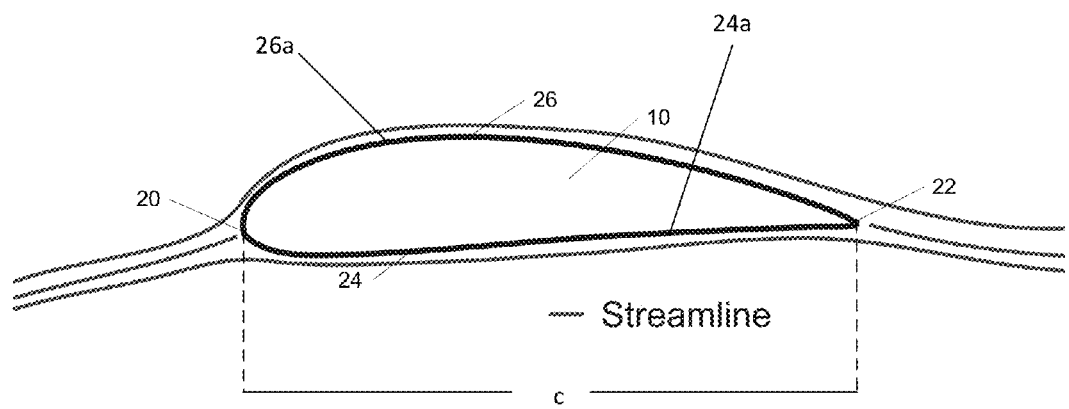
FIG. 2 is a schematic sectional view of a rotor blade representing airflow under normal wind conditions.
Figure 3:
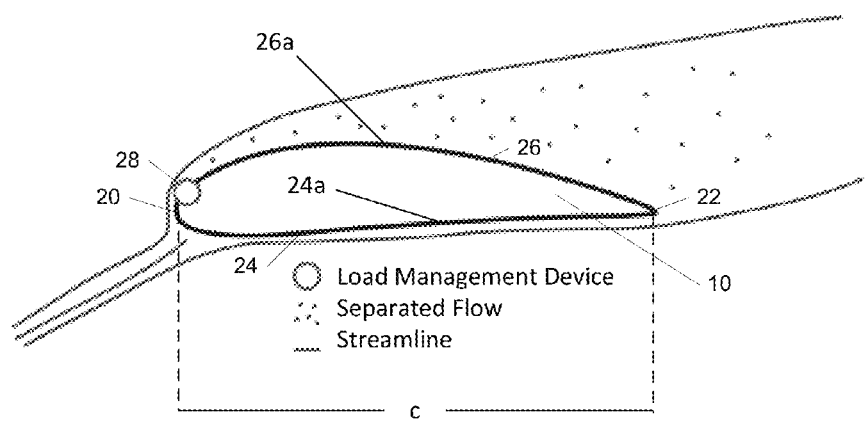
FIG. 3 is a schematic sectional view of the rotor blade of FIG. 2 representing airflow with a load management device in an extended position.

Each rotor blade 10 may include one or more load management devices 28 as schematically depicted in FIG. 3. The blade 10 depicted in the figures is merely one illustrative cross-sectional design and it is recognized that infinite cross-sectional variations can be used as part of the present invention. The rotor blade 10 may be made of any suitable construction and materials, such as fiberglass and/or carbon fiber. Load management devices 28 located on blade 10 may disrupt the airflow along the rotor blade 10 in order to, e.g., destroy lift at the rotor blade 10 (and thus ultimately reduce rotor speed of the wind turbine 2 and corresponding loads on each of its components). The functionality of load management devices 28 is generally illustrated in FIGS. 2-3. For example, FIG. 2 shows a rotor blade 10 being subjected to airflow under normal wind conditions. Rotor blade 10 has a leading edge 20, a trailing edge 22, a high pressure side 24, and a low pressure side 26. A chord line c can be defined as a line between the leading edge 20 and trailing edge 22 of the blade 10. It is recognized that the leading side of the rotor blade 10 corresponds to the leading half of the rotor blade 10 and the trailing side of the rotor blade 10 to the trailing half of the rotor blade 10.

Without any load management device 28 actuated (as shown in, e.g., FIG. 2), a lift force created by a difference in pressure between low pressure side 26 and high pressure side 24 will increase as wind speed increases. For example, the more curved surface 26a and the opposing less curved surface 24a create the dynamics of the low pressure side 26 and the high pressure side 24 due to well-known principles of aerodynamics. This, in combination with the airflow over the rotor blade 10, creates an effect known as "lift" that assists in the rotation of the rotor. Absent load management devices 28, in high wind speeds, a wind turbine 2 could experience damaging loads to one or more components. For example, because loads on various components increase as rotor speed of the wind turbine 2 increases, and because the lift created between a difference in pressure on low pressure side 26 and high pressure side 24 will continue to increase with wind speed thus increasing rotor speed of the wind turbine 2, if wind speeds become too high, wind turbine 2 may experience damaging loads.

Thus, some aspects of the invention utilizes one or more load management devices 28 to disrupt airflow along rotor blade 10 when, e.g., wind speed becomes too high, thus decreasing lift and rotor speed, and reducing the load on wind turbine 2 and its various components. FIG. 3 illustrates rotor blade 10 utilizing load management device 28. Load management device 28 may be any load management device suitable for disrupting airflow. According to some aspect of the invention, load management device 28 may be, e.g., an air deflector as will be discussed more fully. Load management device 28 is actuated when a sensor determines the rotor blade 10 is exceeding a maximum rated speed of the wind turbine 2 and/or when a sensor senses loads on various components of wind turbine 2 are exceeding threshold values. Load management device 28 induces flow separation along a side of the rotor blade 10 (in the depicted embodiment, along low pressure side 26). Accordingly, when actuated, load management device 28 may help decrease loads experienced by various components of wind turbine 2 in, e.g., high wind conditions.

Figure 4:
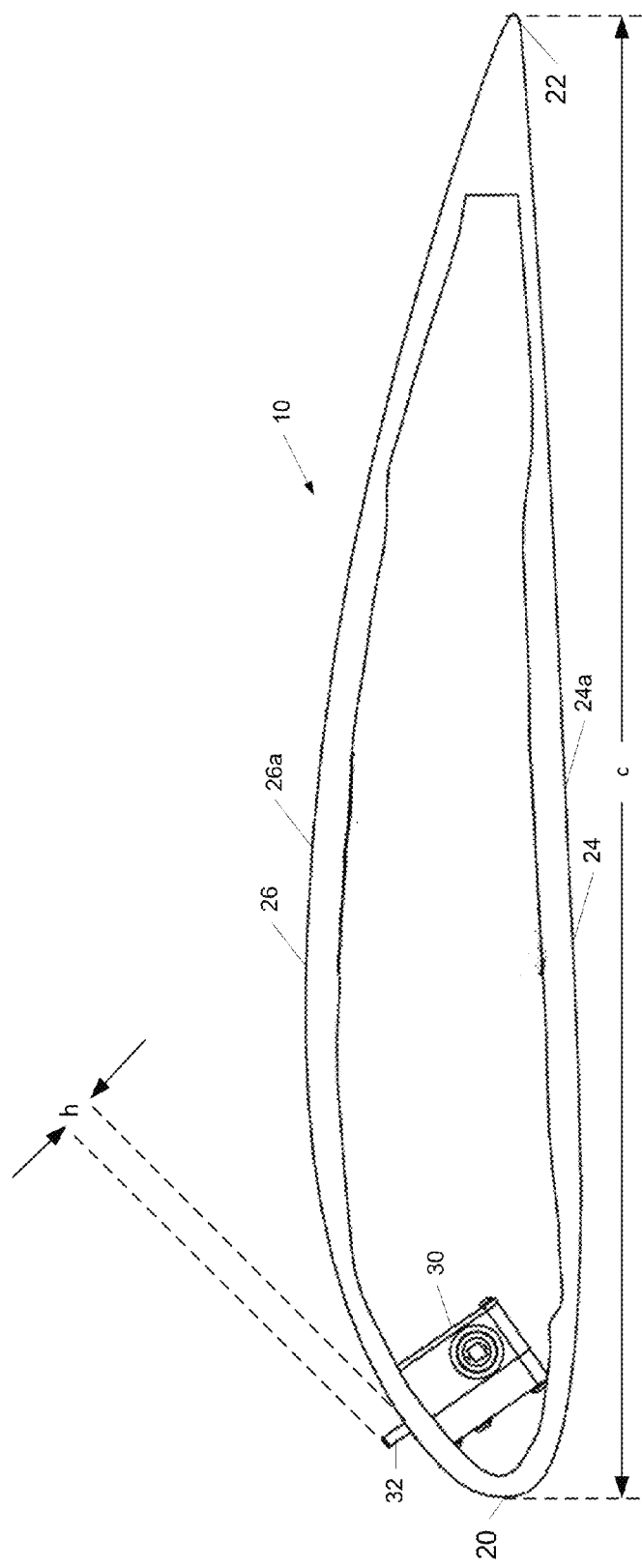
FIG. 4 is cross-section through a rotor blade depicting an air deflector according to one aspect of the invention.

FIG. 4 illustrates a cross section of rotor blade 10 employing an air deflector 32 as an example of a load management device 28 according to one or more aspects of the invention. As can be seen in FIG. 4, rotor blade 10 further includes at least one actuator 30. Air deflector 32 is movable between an extended position in which the air deflector 32 extends from an exterior surface of the rotor blade 10 and a retracted position in which the air deflector 32 is substantially flush with, recessed from, or otherwise does not materially extend from the exterior surface of the rotor blade 10. For example, actuator 30 may extend and retract air deflector 32 according to sensed operating conditions when directed by, e.g., a controller (not shown).

FIG. 4 depicts a placement of actuator 30 and air deflector 32 to affect the airflow on the low pressure side 26 of rotor blade 10. However, in practice, actuator 30 and air deflector 32 may be placed to affect the airflow on the high pressure side 24 of rotor blade 10. Further, actuator 30 and air deflector 32 may be placed in any position chordwise along rotor blade, such that in some embodiments air deflector 32 will be disposed in the trailing half of rotor blade 10 rather than the leading half as depicted. Further, and as will be discussed more fully, rotor blade 10 may comprise more than one actuator 30 and/or air deflector 32.

Air deflector 32 may be sized based on the desired wind turbine condition parameter and further in view of the number of load management devices 28 used. Air deflector 32 may be made from any suitable material, such as fiberglass, carbon fiber, stainless steel, plastic, polycarbonate, and/or aluminum, etc. Air deflector 32 may be of any desired width, for example from a few inches to several feet. Additionally, air deflector 32 may extend from the airfoil surface to any desired height, e.g., from less than a percent to a few percent of the chord c, and air deflector 32 may have any suitable thickness based on the material chosen, typically less than one inch.

Figure 5:
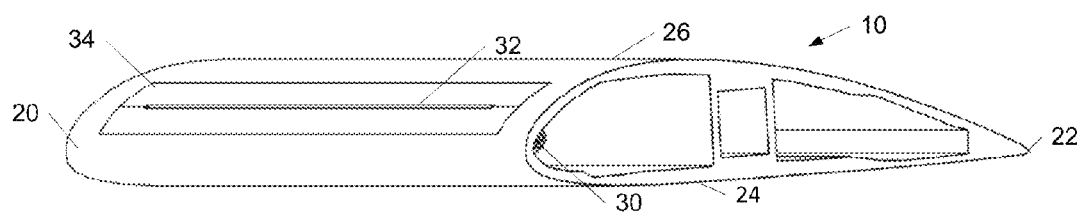
FIG. 5 is an isometric sectional view through the rotor blade depicting the air deflector of FIG. 4 in a retracted position.
Figure 6:
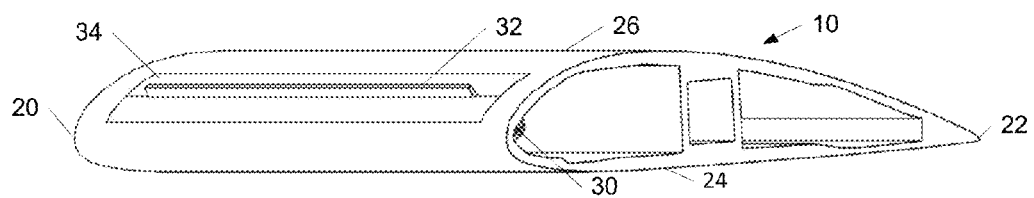
FIG. 6 is an isometric sectional view through the rotor blade depicting the air deflector of FIG. 4 in an extended position.

FIGS. 5-6 are isometric sectional views through the rotor blade 10 depicting the actuator 30 with the air deflector 32 in a retracted position (FIG. 5) and in an extended position (FIG. 6). The actuator 30 is suitably mounted by an interface to substantially maintain the surface contour the rotor blade 10. In another arrangement, the leading face of the actuator 30 may be mounted to the underside of the rotor blade 10. Suitable fastening arrangements such as hardware and adhesives may be used.

Figure 7:
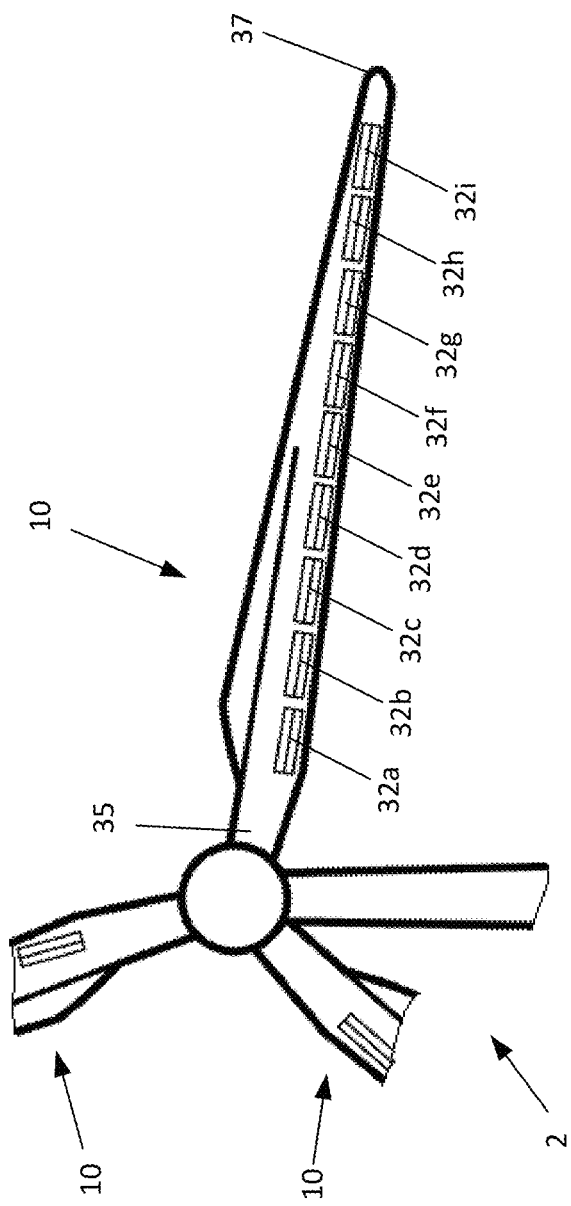
FIG. 7 is a schematic of a rotor blade comprising multiple air deflectors arranged spanwise alone the rotor blade.

According to some aspects of the invention, multiple load management devices 28 may be provided on a rotor blade 10. For example, in some embodiments multiple actuators 30 and/or air deflectors 32 may be arranged and spaced spanwise along the length of rotor blade 10. As illustrated in FIG. 7, multiple air deflectors 32a-32i may be arranged along rotor blade 10. In FIG. 7, the remaining components of wind turbine 2 (e.g., other rotor blades 10, tower 6, foundation 4, etc.) have been truncated and/or not depicted for simplicity. However, one skilled in the art given the benefit of this disclosure will appreciate that the two additional rotor blades 10 may comprise multiple air deflectors 32 arranged in a similar fashion as those depicted in FIG. 7. In such embodiments comprising multiple load management devices 28 (e.g., multiple actuators 30 and/or air deflectors 32) the number of load management devices 28 actuated (e.g., extended) at any given time may depend on sensed operating conditions of the rotor blade 10 and/or wind turbine 2. For example, in some instances a sensor (e.g., accelerometer, differential-pressure sensor, speed sensor, power sensor, etc.) may determine that the rotor speed of wind turbine 2 is at or above a maximum rated speed for wind turbine 2. According, a controller or other suitable device (not shown) may instruct one or more actuators 30 to actuate one or more air deflectors 32 in order to bring the rotor speed and/or loads within an acceptable range.

Figure 8:
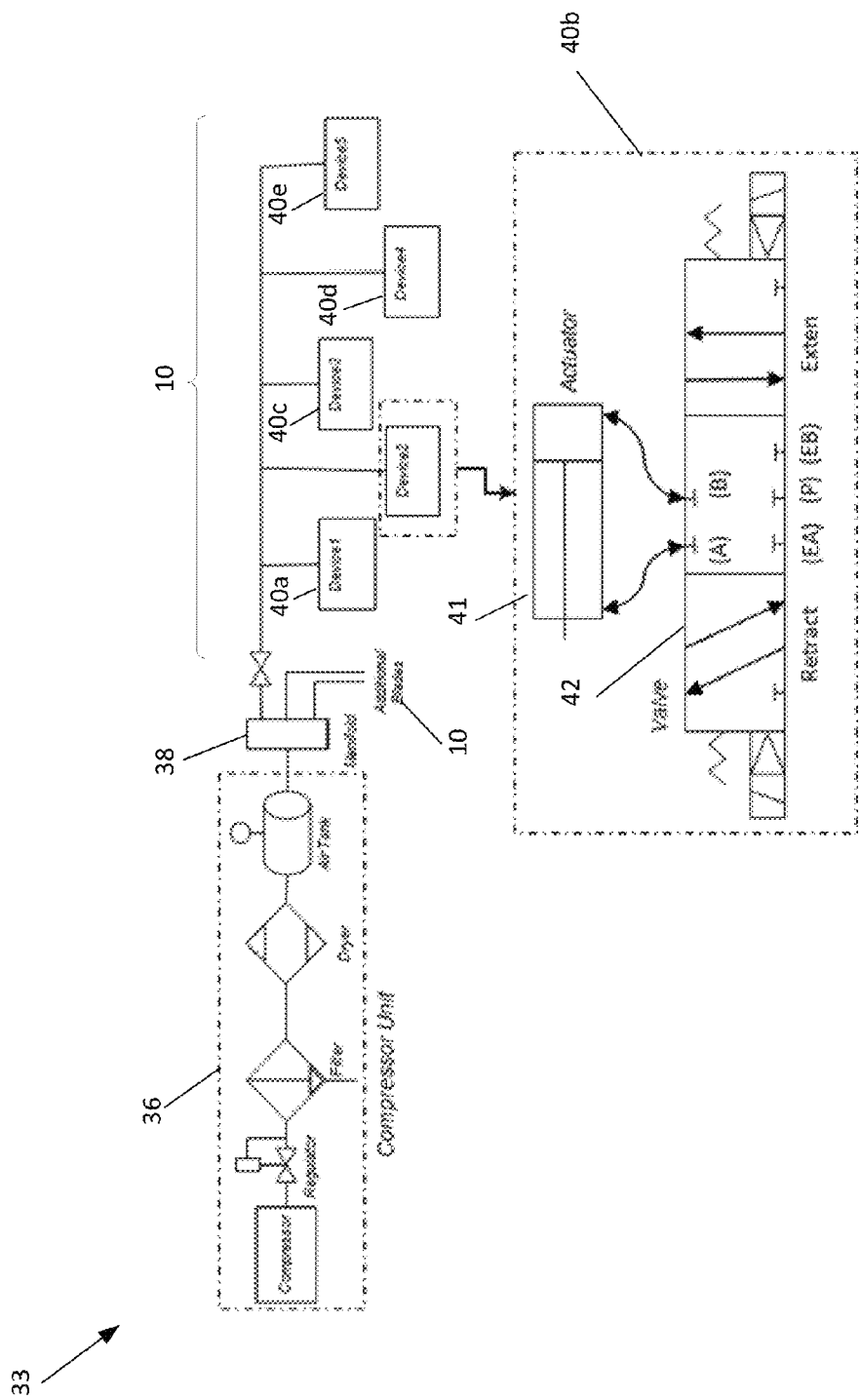
FIG. 8 is a schematic of a pneumatic system used to actuate one or more load management devices according to some aspects of the invention.

According to some aspects of the invention, the one or more actuators 30 may be pneumatically operated. In such embodiments, wind turbine 2 may comprise one or more pneumatic systems 33 as depicted in FIG. 8. Pneumatic system 33 may comprise a compressor unit 36 for, e.g., compressing air to be used in the pneumatic system 33 as is well known in the art. Compressor unit 36 may comprise a compressor, regulator, dryer, and air tank for storing the compressed air. Compressed air from the air tank of compressor unit 36 may be fed to manifold 38. Manifold 38 may be used to, e.g., direct the compressed air to one or more blades 10 of wind turbine 2. For example, as depicted in FIG. 8, in some embodiments manifold 38 may direct compressed air to three blades 10. The pneumatic system 33 may further comprise one or more actuation devices 40 disposed at one or more blades 10. For example, in the depicted embodiment, one blade 10 may comprise five actuation devices 40a-40e. Each actuation device 40 may comprise, e.g., a pneumatic actuator 41, a valve 42, and a load management device 28 (e.g., air deflector 32, not shown). Each pneumatic actuator 41 may be configured to move between a retract position (e.g., when port "A" in valve 42 connects to pressure port "P" and when port "B" in valve 42 connects to an exhaust port "EB") and an extended position (e.g., when port "A" in valve 42 connects to an exhaust port "EA" and when port "B" in valve 42 connects to a pressure port "P").

For example, in some embodiments, pneumatic actuator 41 may be, e.g., a pneumatic piston. In such embodiments, when valve 42 moves to a retract position (not shown), port "A" connects to pressure port "P" and compressed air is provided to the left side of the pneumatic piston forcing the piston to move from the left to right (e.g., retract). During such movement, because port "B" is connected to exhaust port "EB," any compressed air located on the right side of the pneumatic piston will be exhausted. However, when valve 42 moves to an extend position (as shown in FIG. 8), port "B" connects to pressure port "P" and compressed air is provided to the right side of the pneumatic piston forcing the piston to move from right to left (e.g., extend). During such movement, because port "A" is connected to exhaust port "EA," any compressed air located on the left side of the pneumatic piston will be exhausted.

Figure 9:
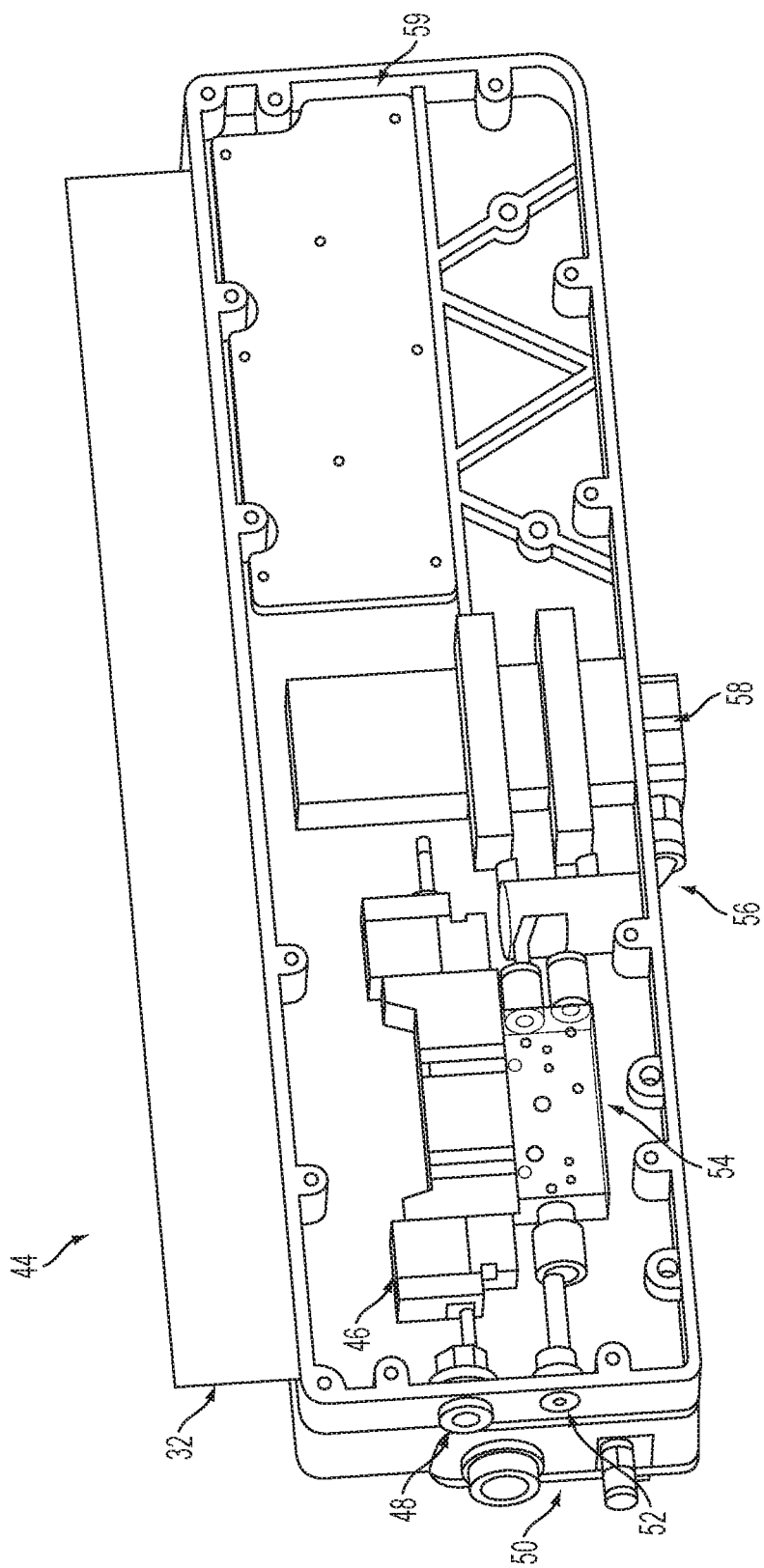
FIG. 9 is a perspective view of a direct pneumatic actuator configured to actuate one or more load management devices according to some aspects of the invention.

According to some aspects of the invention, a load management device 28 (e.g., air deflector 32) on a wind turbine 2 may be actuated (e.g., extended and retracted) using, e.g., pneumatic system 33. For example, and as depicted in FIG. 9, a direct pneumatic actuator 44 (as one example of pneumatic device 40) may actuate a load management device 28 using pneumatic system 33. In some embodiments, direct pneumatic actuator 44 may comprise a pneumatic control valve 46, an electrical connector 48, a sensing unit 50, an air line connection 52, a manifold 54, an air line 56, a pneumatic piston 58, and/or a controller 59. Further, direct pneumatic actuator 44 may comprise air deflector 32. For example, pneumatic piston 58 may be coupled to air deflector 32 such that when pneumatic piston 58 moves from, e.g., an extended position to a retracted piston (as discussed), air deflector 32 will be retracted. Similarly, when pneumatic piston 58 moves from, e.g., a retracted position to an extended position, air deflector 32 will be extended.

For example, in some embodiments one or more sensors (including, e.g., sensing unit 50 and/or one or more additional sensing components, not shown) may detect, e.g., one or more aerodynamic loads, etc., acting on a blade 10. Further, one or more controllers may determine, e.g., that air deflector 32 should be extended in response to the sensed load. Accordingly, controller 59 may instruct pneumatic control valve 46 to move from the "retract" position to the "extend" position. In such embodiments, compressed air may enter direct pneumatic actuator 44 through air line connection 52, pass through manifold 54 and/or pneumatic control valve 46, and travel through air line 56 to pneumatic piston 58, where the pressure of the compressed air moves the pneumatic piston 58 (coupled to air deflector 32) upward, and thus deploys air deflector 32. Similarly, if one or more controllers later determine air deflector 32 should be retracted (in response to, e.g., sensed conditions by sensing unit 50), controller 59 may instruct pneumatic control valve 46 to move from the "extend" position to a "retract position," at which time compressed air will be provided to a top of pneumatic piston 58 and the air previously provided to the bottom of the piston will be exhausted. Accordingly, the pneumatic piston 58 (and thus air deflector 32) will be retracted.

Figure 10:
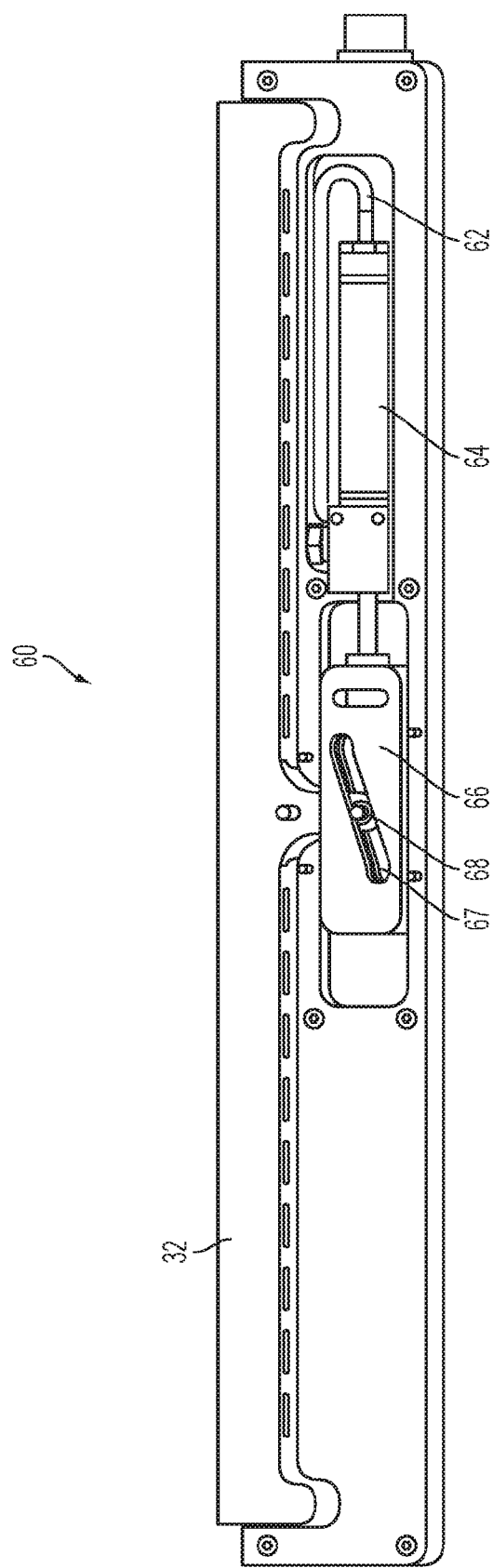
FIG. 10 is a perspective view of a ramp slide pneumatic actuator configured to actuate one or more load management devices according to some aspects of the invention.

According to other aspects, a pneumatic actuator 41 may not be directly coupled to the load management device 28 (e.g., air deflector 32). For example, as depicted in FIG. 10, ramp slide pneumatic actuator 60 comprises a ramp linkage 66 used to extend and retract air deflector 32. In order to extend air deflector 32 according to this embodiment, air is provided to pneumatic piston 64 via, e.g., air line 62, which causes pneumatic piston 64 to move to the left. Because pneumatic piston 64 is coupled to ramp linkage 66, ramp linkage 66 similarly moves to the left. Further, air deflector 32 may be connected to ramp linkage 66 via a connecting pin 68 disposed in a diagonal slot 67 of ramp linkage 66. In this embodiment, air deflector 32 is configured to move in an extend/retract direction (e.g., up and down direction) but is not configured to move in a right to left direction. Thus, when ramp linkage 66 moves to the left, connection pin 68 moves up the diagonal slot 67 (e.g., the ramp) and accordingly air deflector 32 is extended. Similarly, when pneumatic piston 64 and ramp linkage 66 move to the right so too does ramp linkage 66, and the connection pin 68 moves down diagonal slot 67 (e.g., slides down the ramp) and thus air deflector 32 is retracted.

Figure 11:
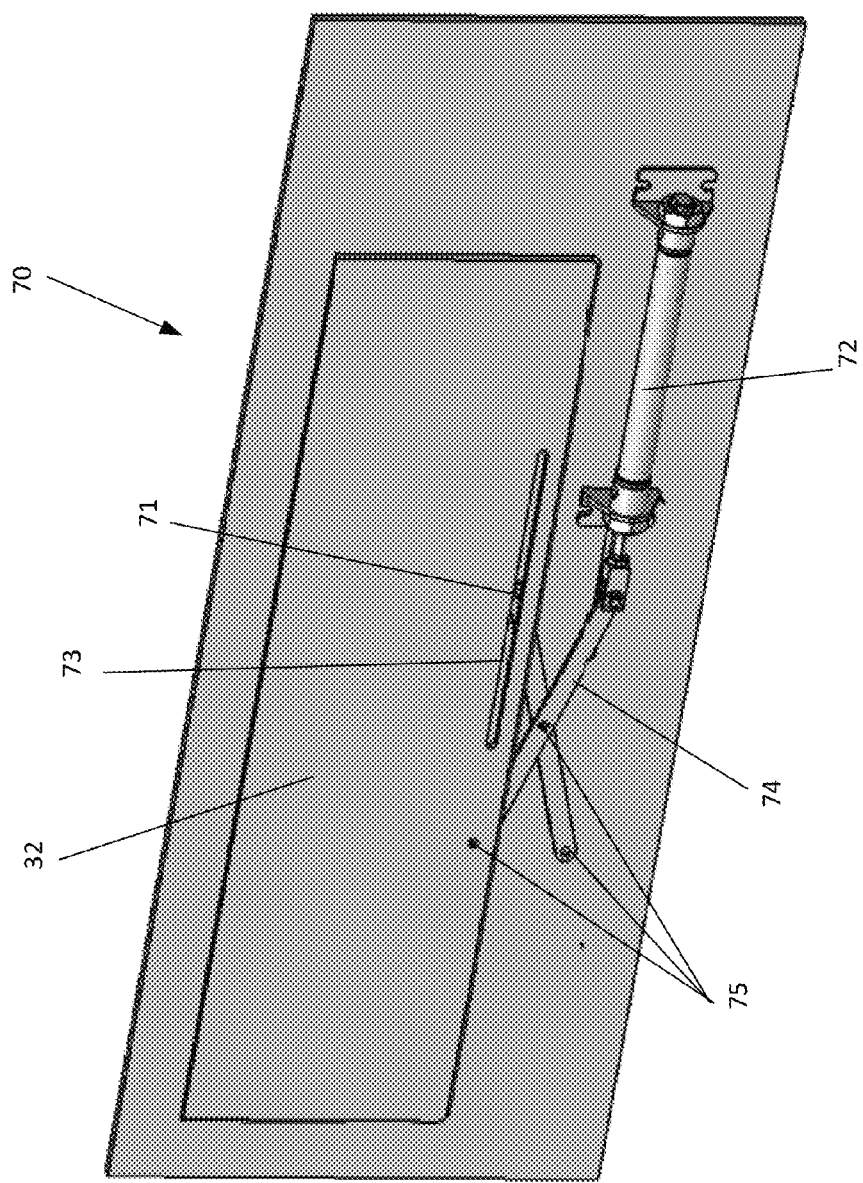
FIG. 11 is a perspective view of a scissor actuator configured to actuate one or more load management devices according to some aspects of the invention.

According to other aspects, a pneumatic actuator 41 may be coupled to an air deflector 32 using, e.g., scissor linkage 74 as depicted in FIG. 11. For example, in some embodiments scissor actuator 70 may comprise, e.g., a pneumatic piston 72, scissor linkage 74, one or more pivot pins 75, air deflector 32 comprising a horizontal slot 73, and/or connecting pin 71 disposed on the end of one arm of scissor linkage 74 and in horizontal slot 73. In such embodiments, when pneumatic piston 72 moves to the left, the scissor linkage 74 pivots above pivot pins 75, and connecting pin 71 slides to the left in horizontal slot 73. Because (as discussed) air deflector 32 is configured to move up and down but not left to right, when the pneumatic piston 72 moves to the left (causing the arms of scissor linkage 74 to become more vertical) connecting pin 71 moves to the left (in horizontal slot 73) and up with the end of the arm of scissor linkage 74, forcing air deflector 32 up (e.g., extending air deflector 32). Similarly, when pneumatic piston 72 moves to the right (e.g., retracts) the arms of scissor linkage 74 become more horizontal, and connecting pin 71 moves to the right in horizontal slot 73 and down with the end of the arm of scissor linkage 74, forcing air deflector 32 down (e.g., retracts).

One skilled in the art will appreciate that any of the above pneumatic devices 40 (e.g., direct pneumatic actuator 44, ramp slide pneumatic actuator 60, and/or scissor actuator 70), may be employed using a system other than, e.g., pneumatic system 33. For example, in some embodiments pneumatic pistons 58, 64, and 72 may be replaced by, e.g., a linear induction motor, solenoid, or other electrical motor, etc. (to be more fully discussed) without departing from the scope of this disclosure.

Figure 12:
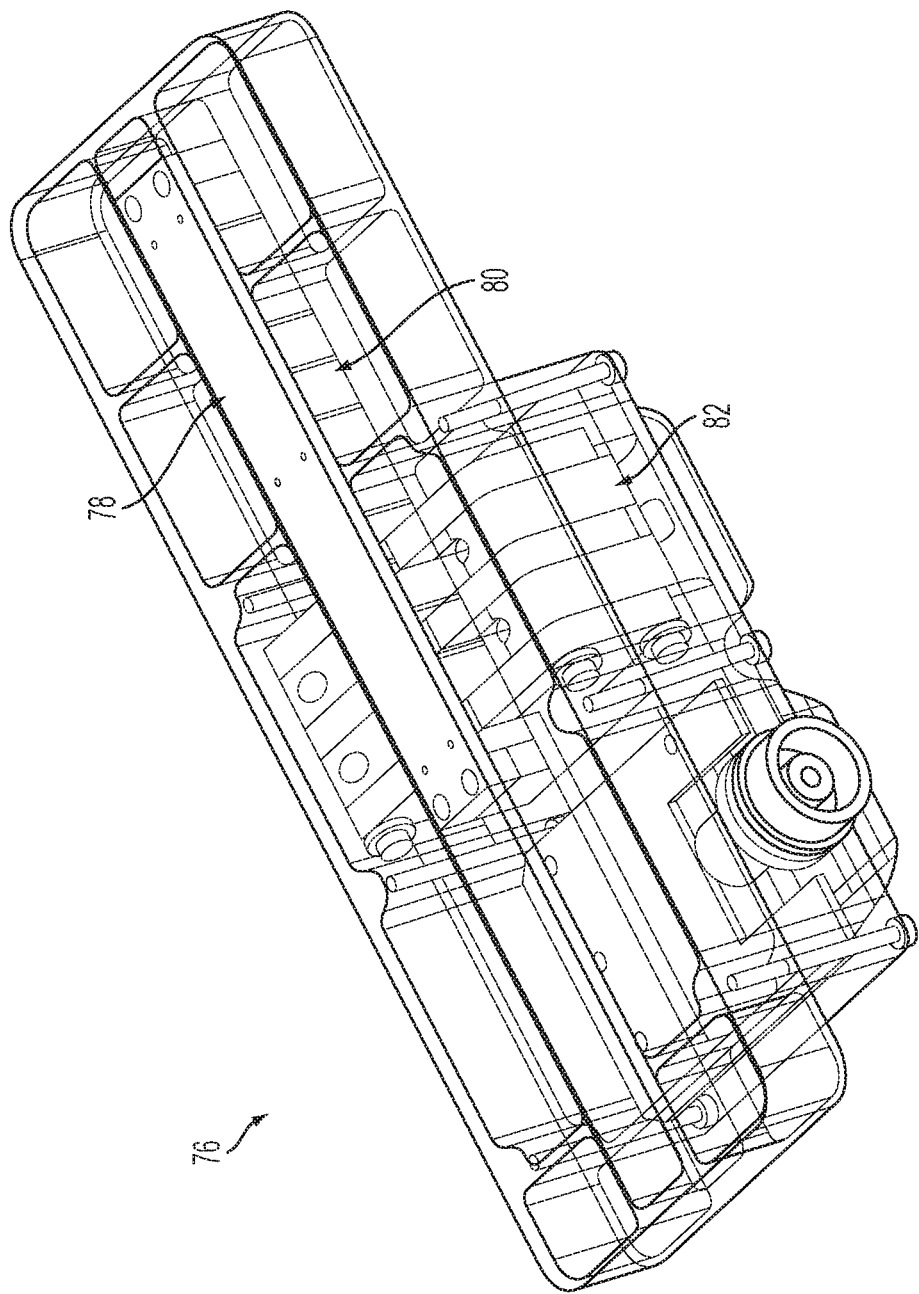
FIG. 12 is a perspective view of a linear induction actuator configured to actuate one or more load management devices according to some aspects of the invention.

According to some aspects, a load management device 28 (e.g., air deflector 32) may be actuated using, e.g., linear induction actuator 76 as depicted in FIG. 12. In some embodiments, linear induction actuator 76 may comprise a translating member 78, permanent magnets 80, and electromagnet 82. Translating member 78 may be, e.g., a component that air deflector 32 is mounted to, or in some embodiments, may be air deflector 32 itself. In the depicted embodiment, permanent magnets 80 are attached to translating member 78. In operation, when supplied with an electrical current, electromagnet creates a magnetic field which causes translating member 78 (due to permanent magnets 80 attached to translating member 78 and disposed in the created magnetic field) to move in a linear direction (e.g., a direction extending the air deflector 32). When the electrical current is reversed in electromagnet 82, a magnetic field created in an opposite direction causes translating member 78 (due to permanent magnets 80 attached to translating member 78 ad disposed in the created magnetic field) to move in an opposite linear direction (e.g., a direction retracting air deflector 32).

Linear induction actuator 76 may provide one or more of the benefits discussed herein when used on, e.g., a blade 10 of wind turbine 2. For example, because the components of linear induction actuator 76 may be solid state, linear induction actuator 76 may not comprise, e.g., rotating parts or bearings prone to failure. Further, because drive electronics of linear induction actuator 76 may be isolated from, e.g., a cavity for receiving air deflector 32, such electronics may be isolated from, e.g., moisture or other contamination. Further, linear induction actuator 76 may be programmed for multiple extension heights and/or motion profiles of air deflector 32 by, e.g., varying the electrical current supplied to electromagnet 82.

Figure 13:
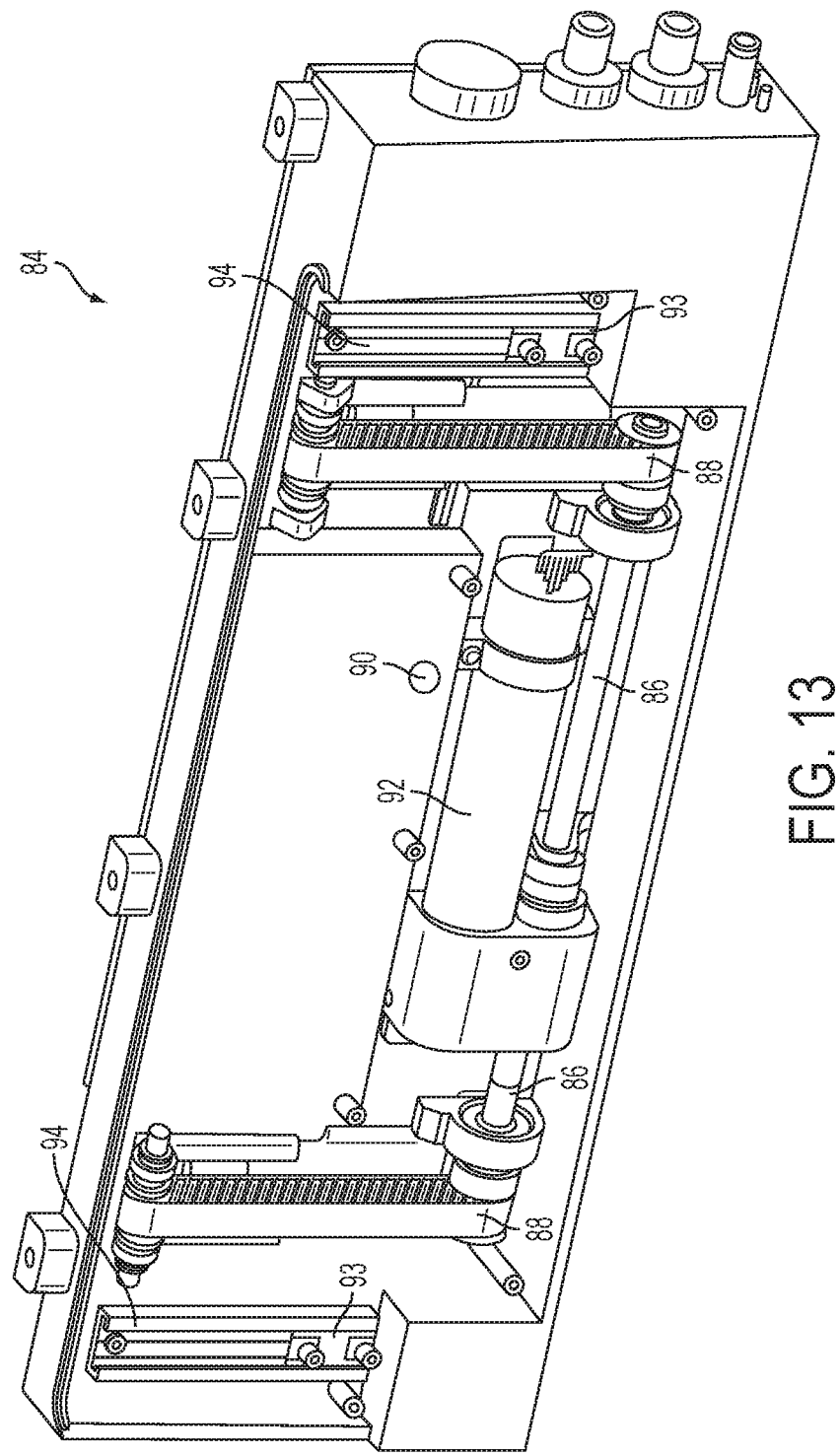
FIG. 13 is a perspective view of a belt actuator configured to actuate one or more load management devices according to some aspects of the invention.

According to some aspects, a belt actuator 84 may be used to actuate one or more load management devices 28 (e.g., air deflector 32) as depicted in FIG. 13. In some embodiments, belt actuator 84 may comprise one or more timing belts 88 connected to motor 92 through, e.g., linkage 86. Although not shown in FIG. 13, a load management device 28 (e.g., air deflector 32) may be coupled to timing belts 88 and slidably coupled to linear bearing 94 via, e.g., mounting 93. In such embodiments, when motor 92 turns the one or more timing belts 88 via linkage 86, air deflector 32 will move vertically along linear bearing 94 due to air deflector 32 being fixedly coupled to timing belts 88 and slidably coupled to liner bearing 94 via mounting 93. In some embodiments, belt actuator 84 may comprise one or more position sensors, such as zero position sensor 90. Such sensors may sense a location of, e.g., air deflector 32 and accordingly provide feedback to motor 92. For example, in embodiments comprising zero position sensor 90, when air deflector 32 is being retracted (e.g., when timing belts 88, fixedly coupled to air deflector 32, are being turned in a counterclockwise direction when viewed from the right side of belt actuator 84 in FIG. 13), motor 92 may continue to turn until, e.g., zero position sensor 90 senses that air deflector 32 has been fully retracted. In response, motor 92 may cease turning timing belts 88 (and thus cease retracting air deflector 32). Other sensors (such as, e.g., halfway position sensors, fully extended position sensors, etc.) may similarly be included in belt actuator 84 (e.g., similar to zero position sensor 90, an encoder located in motor 92 to sense position, etc.) in order to, e.g., extend or retract an air deflector 32 to any desired position.

Belt actuator 84 may provide one or more of the benefits discussed herein when used on, e.g., a blade 10 of wind turbine 2. For example, belt actuator 84 may be relatively compact and thus be suitable for mounting within, e.g., a blade 10. Further, blade actuator 84 may be configured to provide multiple extension heights and/or motion profiles of air deflector 32.

Figure 14:
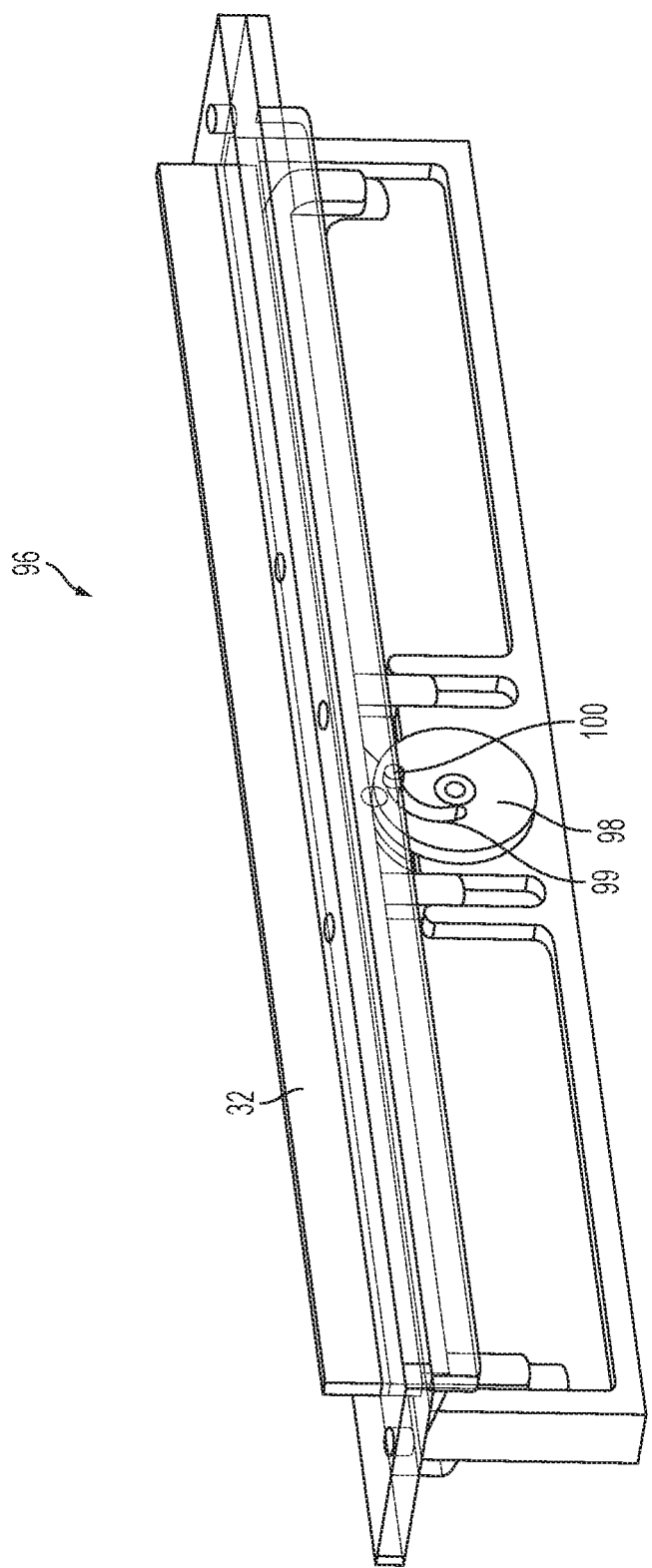
FIG. 14 is a perspective view of a closed cam follower actuator configured to actuate one or more load management devices according to some aspects of the invention.

According to some aspects, a closed cam follower actuator 96 may be used to actuate one or more load management devices 28 (e.g., an air deflector 32) as depicted in FIG. 14. In some embodiments, closed cam follower actuator 96 may comprise a cam 98 including slot 99, air deflector 32, and a connecting pin 100 attached to air deflector 32 and disposed in slot 99. A motor (not shown) may rotate cam 98 which, through linkage with connecting pin 100, extends or retracts air deflector 32 accordingly. For example, air deflector 32 may be configured to move up and down, but may be prevented from moving left or right. Further, and because a counterclockwise-most end of slot 99 is disposed closer radially to a center of cam 98 than a clockwise-most end of slot 99, when a motor rotates cam 98 counterclockwise, the connecting pin 100 will "follow" slot 99 (e.g., move radially away from a center of cam 98 as thus upwards) and accordingly air deflector 32 will be extended. Further, when a motor rotates cam 98 clockwise, the connecting pin 100 will similarly "follow" slot 99 (e.g., move radially towards a center of cam 98 as thus downwards) and accordingly air deflector 32 will be retracted.

Closed cam follower actuator 96 may provide one or more of the benefits discussed herein when used on, e.g., a blade 10 of wind turbine 2. For example, in some embodiments a motor center of mass may be disposed close to a skin of blade 10 (e.g., high pressure side 24 or low pressure side 26). Further, in other embodiments, slot 99 may be configured to provide an optimized force profile according to, e.g., a mounting location of closed cam follower actuator 96 and/or anticipated operating conditions, etc. For example, a smaller slope of slot 99 (e.g., a smaller change in distance from the center of cam 98 to connecting pin 100 per change in position along slot 99) may lead to a greater force applied to connecting pin 100 (and accordingly, air deflector 32) than a larger slope of slot 99. Accordingly, in some embodiments slot 99 may be configured such that a force applied to connecting pin 100/air deflector 32 is constant along an entire extension and/or retraction stroke of air deflector 32 (e.g., the slope of a slot 99 is constant). In other embodiments, slot 99 may be configured such that a force applied to connecting pin 100/air deflector 32 is greater during, e.g., a first part of an extension stroke of air deflector 32 (e.g., slot 99 comprises a smaller slope at a first portion of slot 99). This may be beneficial in order to, e.g., break through a layer of ice or the like which may be covering an opening in blade 10.

Figure 15:
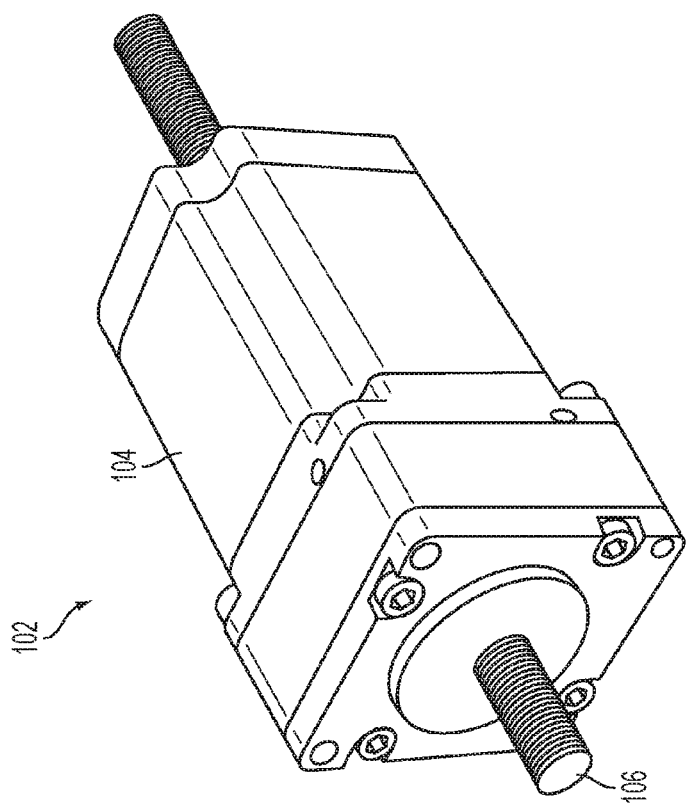
FIG. 15 is a perspective view of a screw drive motor configured to be used in an actuator configured to actuate one or more load management devices according to some aspects of the invention.

According to some aspects, a screw drive actuator 114 may be used to actuate one or more load management devices 28 (e.g., an air deflector 32) as depicted in FIG. 17. In some embodiments, screw drive actuator may comprise, e.g., a screw drive motor 102 as depicted in FIG. 15. Screw drive motor 102 comprises a motor body 104 and a screw 106. An interior of motor body 104 may be threaded for receiving screw 106 such that, when operated, motor body 104 rotates screw 106 and linearly translates screw 106 via interior threads. In some embodiments, this screw may be directly coupled to, e.g., air deflector 32 such that the air deflector 32 will move a same linear distance as screw 106. For example, as depicted in FIG. 17, screw drive motor 102 may be vertically oriented and coupled to air deflector 32, such that when screw 106 linearly translates, air deflector 32 extends and/or retracts.

Figure 16:
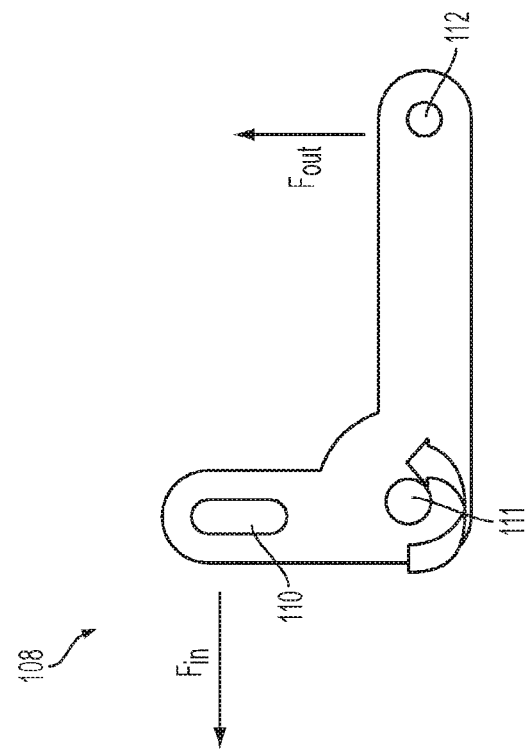
FIG. 16 is a front view of a crank configured to be used with the screw drive motor of FIG. 15 in an actuator configured to actuate one or more load management devices.

However, in other embodiments, screw drive motor 102 may be connected to air deflector 32 using one or more linkages, such as, e.g., crank 108 as depicted in FIG. 16. In such embodiments, crank 108 may be configured to pivot about pivot 111. Further, screw 106 may be coupled to screw connection 110 of crank 108, and air deflector 32 may be coupled to deflector connection 112 of crank 108. Thus, when screw drive motor 102 is operated, causing screw 106 to linearly translate, a force applied to crank 108 via screw connection 110 (depicted as "$F_{in}$" in FIG. 16) is translated via crank 108 to air deflector 32 at deflector connection 112 (depicted as "$F_{out}$" in FIG. 16). In such embodiments, due to a longer length of the arm comprising deflector connection 112 than the arm comprising screw connection 110, air deflector 32 may move a further distance (e.g., extends or retracts) than screw 106 translates. Accordingly, using crank 108 or the like, in some embodiments screw drive motor 102 may be used even if, e.g., the pitch of the threads on screw 106 is relatively small (e.g., screw 106 moves a relatively small linear distance per each rotation).

According to some aspects of the invention, screw drive motor 102 may be configured to be housed within a load management device 28 such as, e.g., air deflector 32. For example, screw drive actuator 114 illustrated in FIG. 17 comprises air deflector 32 and screw drive motor 102 housed within air deflector 32. That is, in at least some vertical positions of air deflector 32 (e.g., fully retracted, less than fully extended, etc.) screw drive motor 102 may be received within an opening provided in air deflector 32.

Screw drive actuator 114 may provide one or more of the benefits discussed herein when used on, e.g., a blade 10 of wind turbine 2. For example, in some embodiments screw 106 may be selected according to a force/displacement profile desired for air deflector 32. That is, in some embodiments, a relatively small pitch of threads may be selected in order to provide a large amount of force applied to air deflector 32. In other embodiments, a relatively large pitch of threads may be selected in order to provide a relatively large amount of displacement of screw 106 (and according faster actuation speeds) per turn of screw drive motor 102. Further, for embodiments where screw drive motor 102 is provided within air deflector 32 (as depicted in screw drive actuator 114 in FIG. 17), such actuators may be relatively compact and thus provide for reduced height requirements at a mounting location of screw drive actuator 114.

Figure 18:
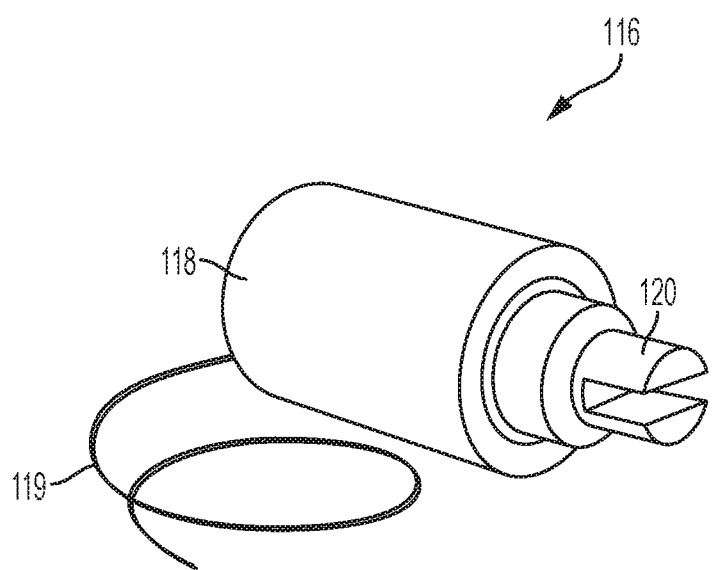
FIG. 18 is a perspective view of a solenoid actuator configured to actuate one or more load management devices according to some aspects of the invention.

According to some aspects, a solenoid actuator 116 may be used to actuate one or more load management devices 28 (e.g., an air deflector 32) as depicted in FIG. 18. In some embodiments, solenoid actuator 116 may comprise solenoid body 118, electrical leads 119, and piston 120. Piston 120 may be configured such that it extends from solenoid body 118 when, e.g., an electrical current is applied to electrical leads 119. For example, solenoid body 118 may internally comprise a coil of wire (not shown) which creates a magnetic field in the direction of the piston 120 extension when an electric current is applied to the coil accordingly to well-known principles. Accordingly, piston 120, which may be constructed of a ferrous metal (e.g., steel or iron, etc.) may extend when electrical current is applied to the coil within solenoid body 118. In such embodiments, piston 120 may be coupled to air deflector 32, and, when actuated, air deflector 32 may thus extend and/or retract along with the movement of piston 120 relative to solenoid body 118.

Solenoid actuator 116 may provide one or more of the benefits discussed herein when used on, e.g., a blade 10 of wind turbine 2. For example, in some embodiments solenoid actuator 116 may provide for very fast actuation times. Further, solenoid actuator containing relatively few moving parts and thus may be reliable and/or robust when incorporated into a wind turbine 2.

Figure 19:
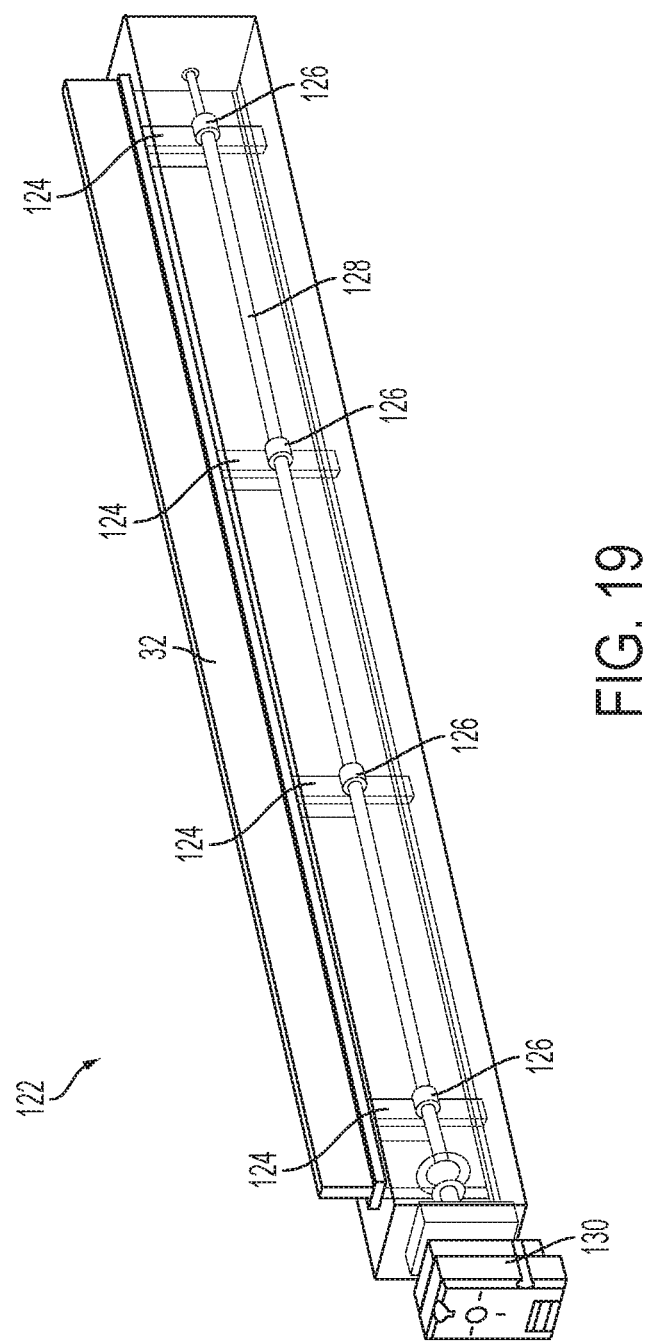
FIG. 19 is a perspective view of a rack and pinion actuator configured to actuate one or more load management devices according to some aspects of the invention.

According to some aspects, a rack and pinion actuator 122 may be used to actuate one or more load management devices 28 (e.g., an air deflector 32) as depicted in FIG. 19. In some embodiments, rack and pinion actuator 122 may comprise one or more racks 124 coupled to air deflector 32, and one or more pinions 126 engaged with the one or more racks 124. In embodiments where rack and pinion actuator 122 comprises more than one rack 124 and correspondingly more than one pinion 126 (such as, e.g., the example depicted in FIG. 19) each pinion may be linked to one another via linkage 128. Further, pinion 126 and/or linkage 128 may be coupled to motor 130. In such embodiments, the engagement of the one or more pinions 126 with the one or more racks 124 causes a movement of air deflector 32 when motor 130 turns. For example, racks 124 and pinions 126 may each comprise gear teeth in mesh engagement with each other. Accordingly, when motor 130 spins in a clockwise direction (when viewed from the left side of the rack and pinion actuator 122 depicted in FIG. 19), an upward force will be translated from each pinion 126 to each rack 124 causing air deflector 32 to move upward (e.g., extend) by virtue of air deflector's 32 coupling to each rack 124. Similarly, when motor 130 spins in a counterclockwise direction, a downward force will be translated from each pinion 126 to each rack 124 causing air deflector 32 to move downward (e.g., retract) by virtue of air deflector's 32 coupling to each rack 124.

Rack and pinion actuator 76 may provide one or more of the benefits discussed herein when used on, e.g., a blade 10 of wind turbine 2. For example, a radius of pinions 124 may be configured in order to achieve desired speed and/or force requirements. For example, a pinion 124 with a larger radius will cause air deflector 32 to move further for every turn of motor 130 than a pinion 124 with a smaller radius. Thus, an appropriate radius may be selected in order to achieve, e.g., appropriate extension/retraction speeds for air deflector 32. Further, rack and pinion actuator 122 may be relatively compact and thus may be utilized across a wide variety of mounting locations.

Figure 20:
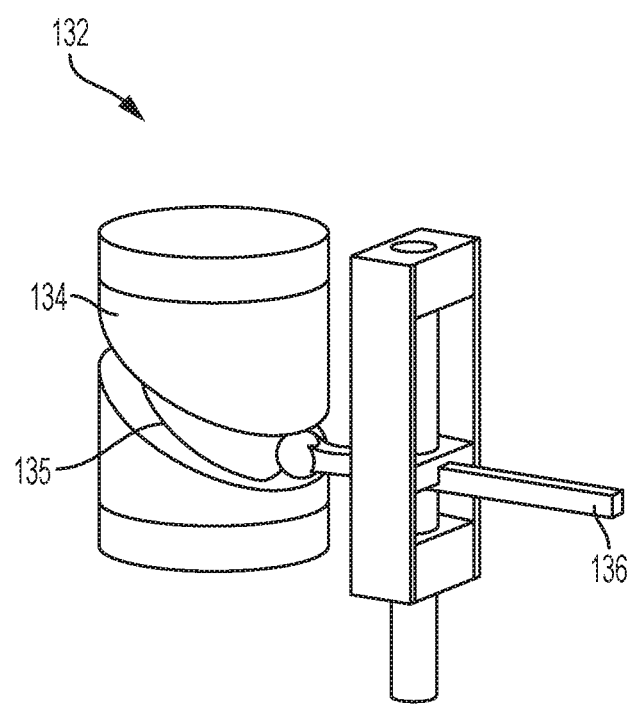
FIG. 20 is a perspective view of a cylindrical cam actuator configured to actuate one or more load management devices according to some aspects of the invention.

According to some aspects, a cylindrical cam actuator 132 may be used to actuate one or more load management devices 28 (e.g., an air deflector 32) as depicted in FIG. 20. In some embodiments, cylindrical cam actuator 132 may comprise cylindrical cam 134 having slot 135, and connection pin 136 disposed in slot 135 and coupled to, e.g., an air deflector 32 (not shown). Cylindrical cam 134 may be coupled to, e.g., a motor (not shown). As discussed, air deflector 32 may be configured such that it can move up and down, but cannot move left or right. Accordingly, in some embodiments, when cylindrical cam 134 is rotated, connection pin 138 (and accordingly air deflector 32 by of its coupling to connection pin 136) will "follow" slot 135 up or down. For example, if cylindrical cam 134 is rotated in a clockwise direction (when viewed from the top of cylindrical cam 134 as depicted in FIG. 20), connection pin 138 will follow slot 135 down causing air deflector to move downwards (e.g., refract). Similarly, if cylindrical cam 134 is rotated in a counterclockwise direction, connection pin 138 will follow slot 135 up causing air deflector to move upwards (e.g., extend).

Cylindrical cam actuator 132 may provide one or more of the benefits discussed herein when used on, e.g., a blade 10 of wind turbine 2. For example, and as discussed in more detail with respect to closed cam follower actuator 96 depicted in FIG. 14, slot 135 may be configured in any desirable manner to provide a desired force and/or motion profile along an extension and/or retraction stroke of air deflector 32.

Figure 21:
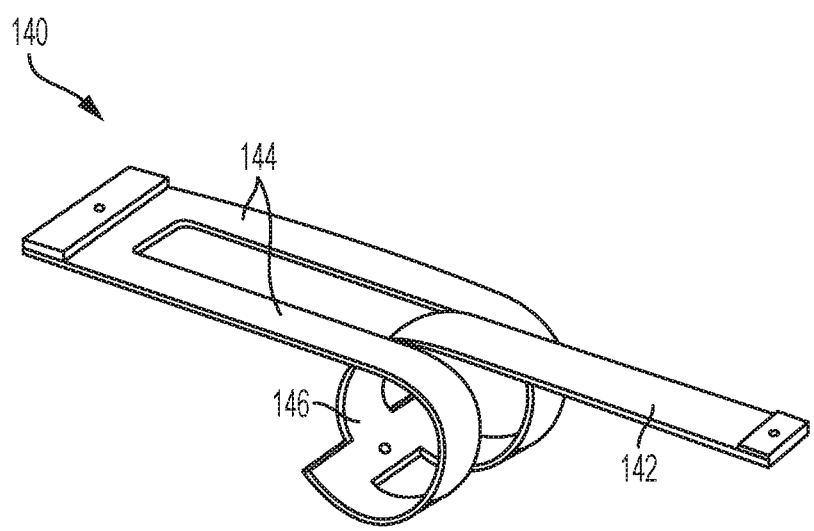
FIG. 21 is a perspective view of a Y-belt actuator configured to actuate one or more load management devices according to some aspects of the invention.

According to some aspects, a Y-belt actuator 140 may be used to actuate one or more load management devices 28 (e.g., an air deflector 32) as depicted in FIG. 21. In some embodiments, Y-belt actuator 140 may comprise single arm 142, double arm 144, and Y-connection 146 connecting single arm 142 to double arm 144. Because Y-connection 146 connects single arm 142 to double arm 144 in the manner shown (e.g., with single arm 142 turned through the space provided on double arm 144), when a center of Y-belt actuator 140 is rotated (by, e.g., a motor, not shown), single arm 142 may pass between each arm of double arm 144. Accordingly, in some embodiments a motor may turn a center portion of Y-belt actuator 140 (e.g., the Y-connection 146) which may rotate nearly 360 degrees (e.g., until Y-connection 146 meets double arm 144). In some embodiments, one of double arm 144 and single arm 142 may be coupled to, e.g., air deflector 32. Thus, when a center portion (e.g., Y-connection 146) of Y-belt actuator 140 is rotated, air deflector 32 may extend and/or retract according to the movement of single arm 142 or double arm 144.

Y-belt actuator 140 may provide one or more of the benefits discussed herein when used on, e.g., a blade 10 of wind turbine 2. For example, Y-belt actuator is relatively compact and thus may be utilized in a variety of mounting locations. Further, in some embodiments, Y-belt actuator 140 may provide relatively quick actuation (e.g., extension and/or retraction) speeds. Further, Y-belt actuator may suffer from little or no backlash as is common in other mechanical devices.

Figure 22:
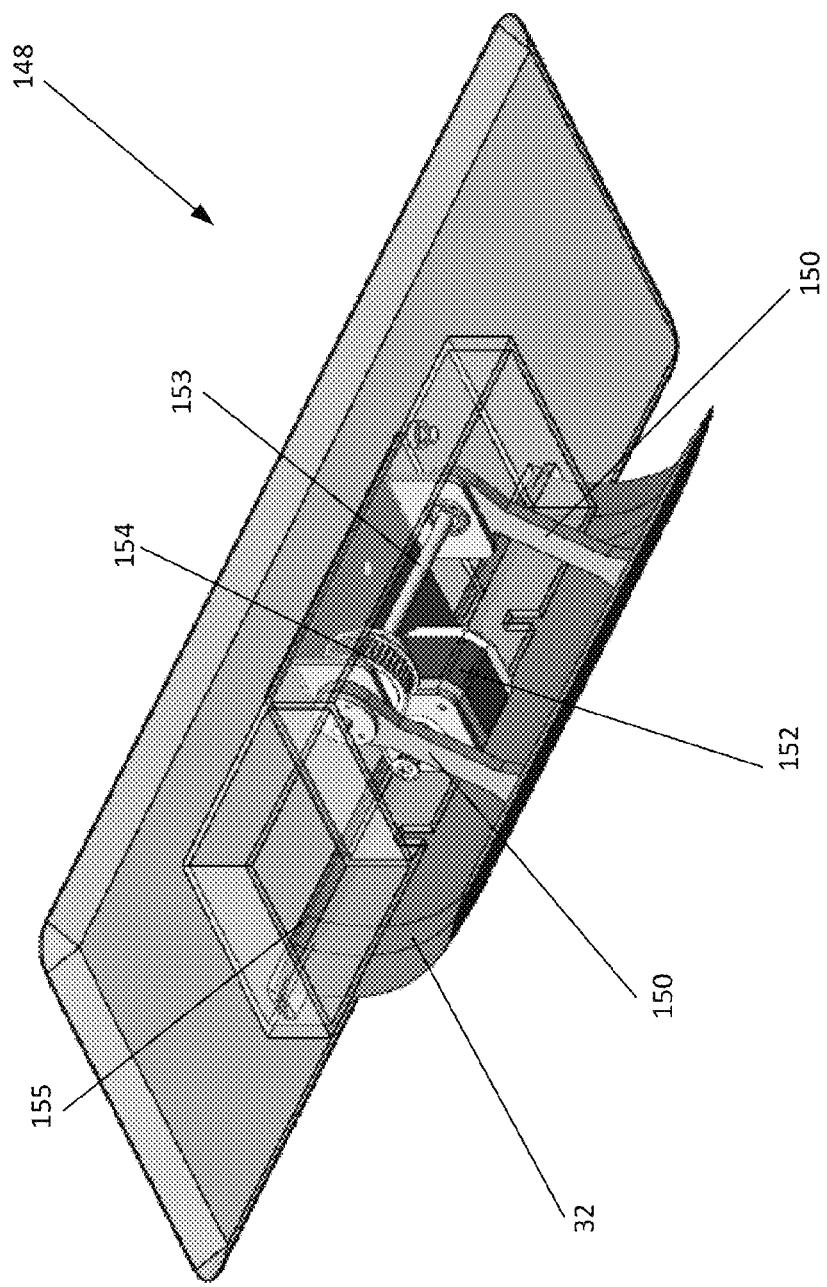
FIG. 22 is a perspective view of an offset rotary drive actuator configured to actuate one or more load management devices according to some aspects of the invention.

According to some aspects, an offset rotary drive actuator 148 may be used to actuate one or more load management devices 28 (e.g., an air deflector 32) as depicted in FIG. 22. In some embodiments, offset rotary drive actuator 148 may comprise motor 152, one or more connecting arms 150 connected to air deflector 32, pulley 154, and/or linkage 153. In some embodiments, pulley 154 may be connected to an output shaft of motor 152 via, e.g., a belt (not shown). Further, each connecting arm 150 may be coupled to pulley 154 via linkage 153. Accordingly, when motor 152 turns, pulley 154 will also turn due to its connection to motor 152 via, e.g., a belt. Further, when pulley 154 turns, connecting arms 150 may rotate about an axis running through the center of pulley 154 and/or linkage 153 due to connecting arms' 150 connection to pulley 154 and/or linkage 153. And because connecting arms 150 are coupled to air deflector 32, when connecting arms 150 rotate about an axis running through the center of pulley 154 and/or linkage 153, so too does air deflector 32 causing leading edge 155 of air deflector to extend and retract from, e.g., blade 10. For example, when motor 152 rotates in a clockwise direction (when viewed from the left side of offset rotary drive actuator 148 as depicted in FIG. 22), pulley 154 will rotate clockwise (via its connection to motor 152), and accordingly air deflector 32 will rotate clockwise (via its connection to pulley 154 and/or linkage 153 by connecting arms 150) with the leading edge 155 of air deflector 32 moving upwards (e.g., extending). Similarly, when motor 152 rotates in a counterclockwise direction, pulley 154 will rotate counterclockwise, and accordingly air deflector 32 will rotate counterclockwise with the leading edge 155 of air deflector 32 moving downwards (e.g., retracting).

Offset rotary drive actuator 148 may provide one or more of the benefits discussed herein when used on, e.g., a blade 10 of wind turbine 2. For example, offset rotary drive actuator 148 may comprise relatively few parts and thus exhibit good reliability and robustness. Further, because air deflector 32 rotates in the manner discussed (rather than, e.g., linearly translating) offset rotary drive actuator 148 may be relatively compact, and thus be suitable for a variety of mounting conditions.

Figure 23:
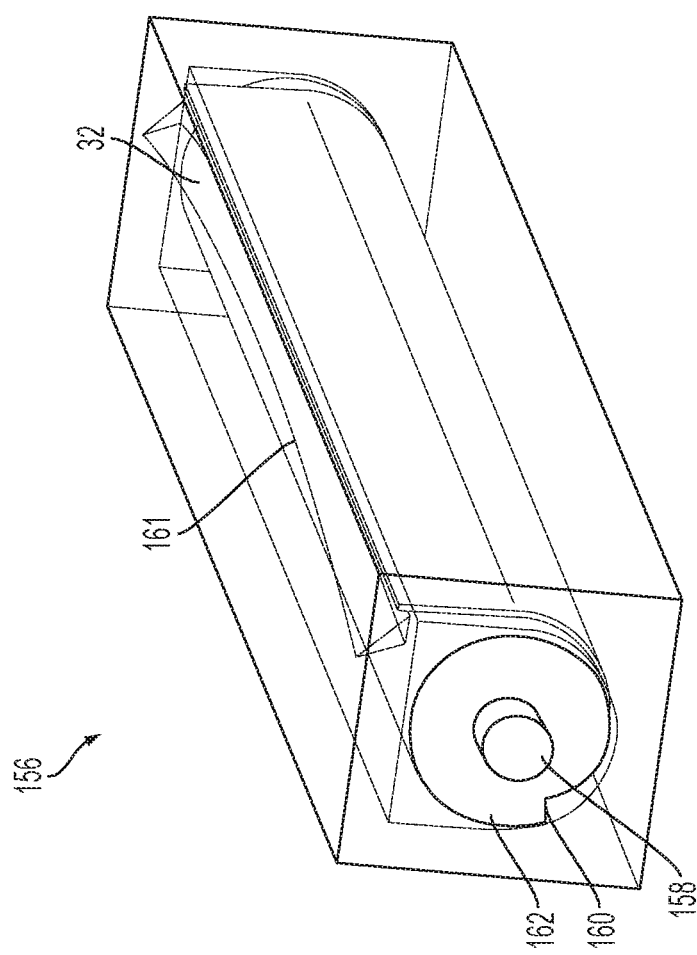
FIG. 23 is a perspective view of a tape actuator configured to actuate one or more load management devices according to some aspects of the invention.

According to some aspects, a tape-style actuator 156 may be used to actuate one or more load management devices 28 (e.g., an air deflector 32) as depicted in FIG. 22. In some embodiments, tape-style actuator 156 may comprise cylinder 162 which rotates about axis 158 and comprises notch 160. Further air deflector 32 may be disposed around a periphery of cylinder 162 with a trailing edge of air deflector 32 abutting notch 160. In such embodiments, when cylinder 162 rotates counterclockwise (when viewed from the left side of tape-style actuator 156 as depicted in FIG. 23), notch 160 will engage the trailing edge of air deflector 32. This engagement will cause air deflector 32 to unwrap from the periphery of cylinder 162 with a leading edge 161 of air deflector 32 rising upward (e.g., extending). Similarly, when cylinder 162 rotates clockwise, air deflector 32 will wrap back around the periphery of cylinder 162 with a leading edge 161 of air deflector 32 moving downward (e.g., retracting).

Figure 24:
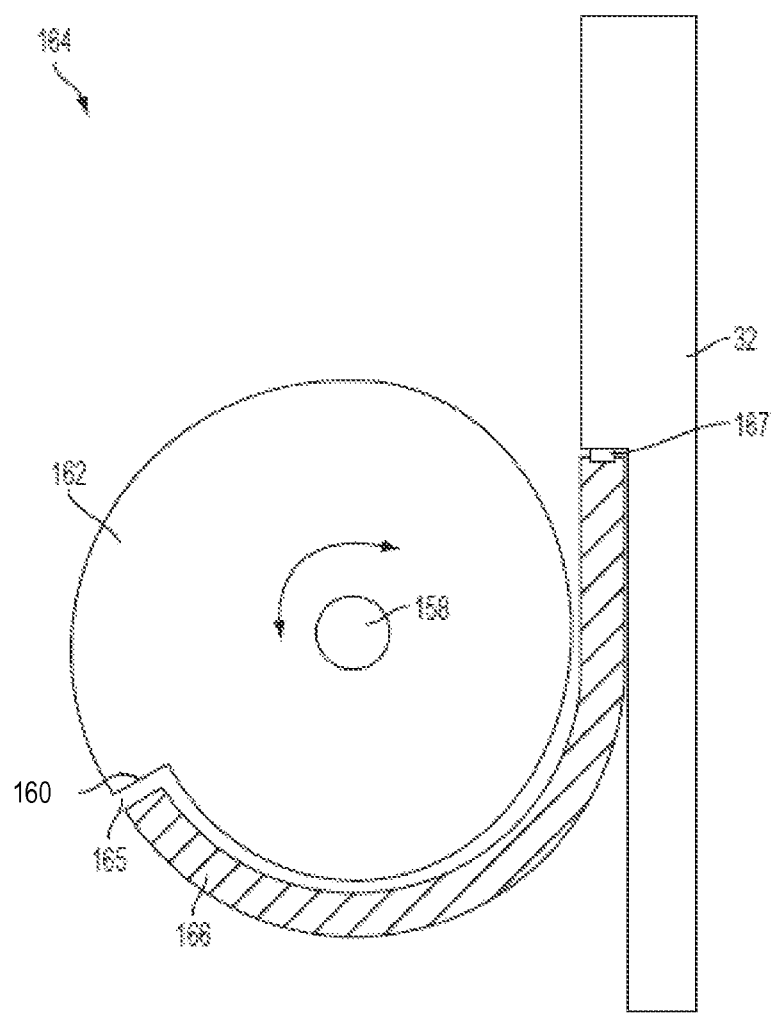
FIG. 24 is a front view of a rigid tape actuator configured to actuate one or more load management devices according to some aspects of the invention.

Rather than wrapping around a periphery of cylinder 162 as depicted in FIG. 23, in some embodiments air deflector 32 may be, e.g., rigid and coupled to a tape 166 configured to wrap around and unwrap from the periphery of cylinder 162 as depicted in FIG. 24. In such embodiments, rigid tape actuator 164 may comprise cylinder 162 which rotates about axis 158 and comprises notch 160, and tape 166 which is coupled to notch 160 at a trailing edge 165 and to a rigid air deflector 32 at a leading edge 167. Thus, in this embodiment, when cylinder 162 rotates counterclockwise (by, e.g., a motor, not shown) notch 160 engages trailing edge 165 and unwraps tape 166 from the periphery of cylinder 162 with leading edge 167 moving upwards. In such an embodiment, because leading edge 167 is coupled to air deflector 32, air deflector 32 similarly moves upwards (e.g., extends). When cylinder 162 rotates clockwise, tape 166 wraps around the periphery of cylinder 162 with leading edge 167 moving downwards. And because leading edge 167 is coupled to air deflector 32, air deflector similarly moves downwards (e.g., retracts).

Tape-style actuator 156 and/or rigid tape actuator 164 may provide one or more of the benefits discussed herein when used on, e.g., a blade 10 of wind turbine 2. For example, because in some embodiments air deflector 32 will wrap around the periphery of cylinder 162, a height of tape-style actuator 156 may be compact. Further, tape-style actuator 156 and/or rigid tape actuator 164 may comprise a small number of parts and thus may exhibit desired reliability and robustness characteristics in a variety of operating conditions.

Figure 25:
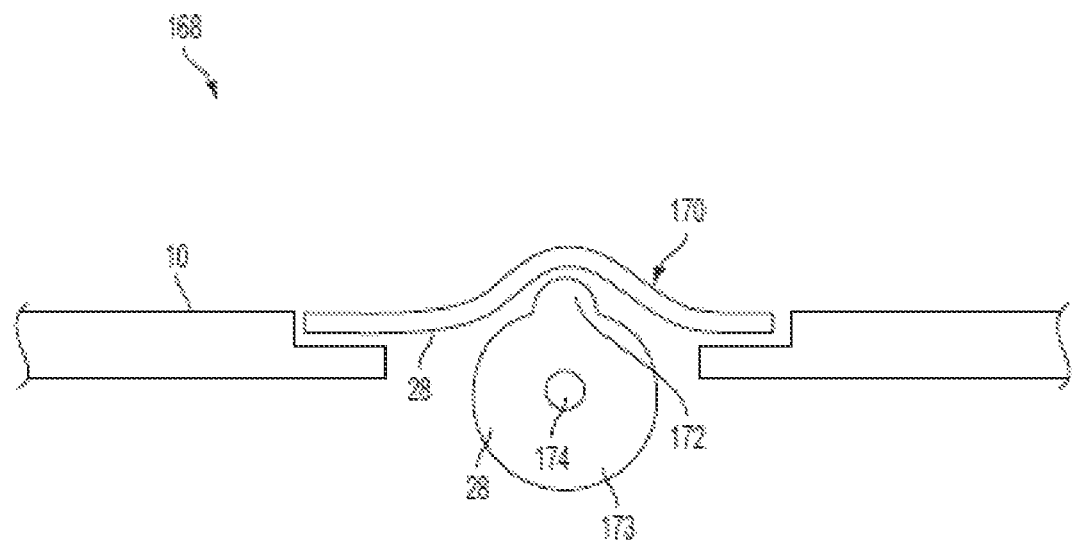
FIG. 25 is a front view of a deformable membrane actuator configured to actuate one or more load management devices according to some aspects of the invention.

According to some aspects, a deformable membrane actuator 168 may be used to actuate one or more load management devices 28 as depicted in FIG. 25. In some embodiments, deformable membrane actuator 168 may comprise a cylinder 173 comprising a cam 172 and a deformable membrane 170 which, in combination, comprise a load management device 28. For example, cylinder 173 may be configured to rotate about axis 174 when, e.g., engaged with a motor (not shown). When a portion of cylinder 173 not comprising cam 172 abuts deformable membrane 170, deformable membrane 170 may be in a first, unreformed state. In such a state, deformable membrane 170 may, e.g., seamlessly form a part of high pressure side 24 or low pressure side 26 of blade 10. However, as cylinder 173 rotates about axis 174 and cam 172 comes into contact with deformable membrane 170, deformable membrane may deform to accommodate cam 172. In such a second, deformed state (as depicted in FIG. 25), the combination of cam 172 and deformable membrane 170 extends beyond a surface of blade 10 to form load management device 28. Deformable membrane 170 may be made of any suitable material to form a semi-rigid surface capable of deforming when in contact with, e.g., cam 172, and in some embodiments may be, e.g., a stainless steel sheet.

Deformable membrane actuator 168 may provide one or more of the benefits discussed herein when used on, e.g., a blade 10 of wind turbine 2. For example, deformable membrane actuator 168 may be relatively light and compact. Further, because deformable membrane actuator 168 does not comprise an opening along a surface of blade 10 in order to, e.g., deploy air deflector 32 or the like, deformable membrane actuator may be resistant to, e.g., moisture and other contamination and thus exhibit desired characteristics of reliability and robustness. Still further, embodiments employing deformable membrane actuator 168 may comprise a smooth surface along, e.g., high pressure side 24 and/or low pressure side 26 of blade 10, with no parts of the actuator (beyond, e.g., an outer surface of deformable membrane 170) exposed outside of the blade 10.

According to some aspects, a memory alloy actuator 176 may be used to actuate one or more load management devices 28 as depicted in FIGS. 26a-26c. In some embodiments, memory alloy actuator 176 may comprise a memory alloy deflector 178 and one or more Peltier chips 180. Memory alloy deflector 178 may be made of a memory alloy which may be configured to move between one or more states when heated and/or cooled. For example, FIG. 26a illustrates memory alloy deflector 178 in a first state and FIG. 26b illustrates memory alloy deflector 178 in a second state. In some embodiments, memory alloy deflector 178 may be configured to move to the first state when, e.g., sufficiently cooled, and may be configured to move to the second state when, e.g., sufficiently heated. In other embodiments, memory alloy deflector 178 may be configured to move to the first state when, e.g., sufficiently heated, and may be configured to move to the second state when, e.g., sufficiently cooled. Memory alloy actuator 176 may further comprise one or more Peltier chips 180 which may be configured to, e.g., heat and/or cool memory alloy deflector 178 when an electric current is applied to Peltier chip 180. Accordingly, in some embodiments, an electric current may be applied to the one or more Peltier chips 180 in order to, e.g., sufficiently heat or cool the surrounding memory allow deflector 178. In such embodiments, the memory alloy deflector 178, when sufficiently heated or cooled, will move to either the first (e.g., retracted) or second (e.g., extended) state. Thus, as illustrated in FIG. 26c, when memory alloy actuator 176 is attached to a blade 10, memory alloy actuator 176 may act as a load management device 28. For example, when in a first state (as depicted in, e.g., FIG. 26a) memory alloy actuator 176 may lay relatively flat along a top surface of blade 10 and thus not affect, e.g., airflow and/or lift along the blade 10. However, when in a second state (as depicted in, e.g., FIGS. 26b and 26c) memory alloy actuator 176 may extend from blade 10 and sufficiently disrupt lift along blade 10 (and thus reduce load).

Memory alloy actuator 176 may provide one or more of the benefits discussed herein when used on, e.g., a blade 10 of wind turbine 2. For example, memory alloy actuator may comprise relatively few parts, and thus may exhibit desired reliability and robustness characteristics. Further, memory alloy actuator 176 may be relatively compact and lightweight, and thus may be installed in a number of mounting locations and may have minimal impact on, e.g., centripetal loading of blade 10, etc.

According to some aspects, a crank slide actuator 182 may be used to actuate one or more load management devices 28 (e.g., an air deflector 32) as depicted in FIGS. 27a-27b. In some embodiments, crank slide actuator 182 may comprise a motor 190 coupled to one or more crank arms 186, which may be pivotally coupled to one or more connecting links 184. The one or more connecting links 184 may also be pivotally coupled to air deflector 32 by joint pins 192 at an opposite ends of connecting links 184 than are pivotally coupled to crank arms 186. Air deflector 32 may further be slidably connected to one or more tracks 188. In some embodiments, crank slide actuator 182 may be mounted to, e.g., a frame of blade 10 or other housing by mounting plate 194.

FIG. 27a illustrates a right-front perspective view of crank slide actuator 182 and air deflector 32 in a retracted state. In such an embodiment, the one or more crank arms 184 may be generally vertical with a majority of each disposed below a shaft of motor 190. Further, the one or more connecting links 184 may be angled such that, in the retracted state (FIG. 27a) a bottom end of each connecting link 184 is pivotally connected to a bottom end of a crank arm 184, a top end of each connecting link 184 is pivotally connected to air deflector 32 via joint pins 192, and a center portion of each connecting link 184 angles around a portion where a shaft of motor 190 is coupled to the corresponding crank arm 186. In such a state, a portion of each connecting link 184 (e.g., approximately half of each connecting link 184) is disposed below a shaft of motor 190 and is abutted to a crank arm 186. FIG. 27b illustrates a left-rear perspective view of crank slide actuator 182 in an extended state. In such a state, the one or more crank arms 184 may be generally vertical, however now a majority of each is disposed above the shaft of motor 190. Further, in this state, a majority of each connecting link 184 is disposed above each of the crank arms 186 and no longer abuts each of the crank arms 186. In operation, when motor 190 turns, the one or more crank arms 186 and one or more connecting links 184 will move from the first (retracted) position to the second (extended) position and thus extend air deflector 32, or move from the second (extended) position to the first (retracted) position and thus retract air deflector 32.

For example, when the motor 190 turns clockwise (when viewed from the right side of crank slide actuator 182 as depicted in FIG. 27a) from the retracted position as depicted in FIG. 27a, crank arm 186 will correspondingly rotate, thus lifting connecting link 184 via each crank arm's 186 pivot connection to connecting link 184. Air deflector 32 (via its connection with the one or more connecting links 184) will thus lift (extend) accordingly by slidably translating along track 188. Similarly, from the extended position depicted in FIG. 27b, when the motor 190 turns counterclockwise (when viewed from the left side of crank slide actuator 182 as depicted in FIG. 27b) the crank arms 186 will correspondingly rotate counterclockwise, thus lowering (retracting) connecting links 184 and thus air deflector 32 along tracks 188. Because air deflector 32 may be slidably connected to one or more tracks 188 and pivotally connected to connecting links 184 via joint pins 192, when moved from the retracted to the extended state or from the extended to the retracted state, air deflector 32 linearly translates between the retracted and extended positions. In some embodiments, motor 190 may turn, e.g., approximately 180 degrees between the first state and the second state.

Crank slide actuator 182 may provide one or more of the benefits discussed herein when used on, e.g., a blade 10 of wind turbine 2. For example, crank slide actuator 182 may be relatively compact and thus be suitable for a variety of mounting locations. Further, crank slide actuator may provide relatively high extension and/or retraction speeds and thus suitably extend or retract, e.g., air deflector 32 from a blade 10 in a desired time (in some embodiments, e.g., 100 ms or less). Further, because each of crank arms 186 and connecting links 184 are generally vertical in a retracted position and in an extended position, crank slide actuator 182 may exhibit a natural "locked" condition when in each position, thus providing ample support to keep the air deflector 32, e.g., either locked in a retracted position or in an extended position.

Figure 28:
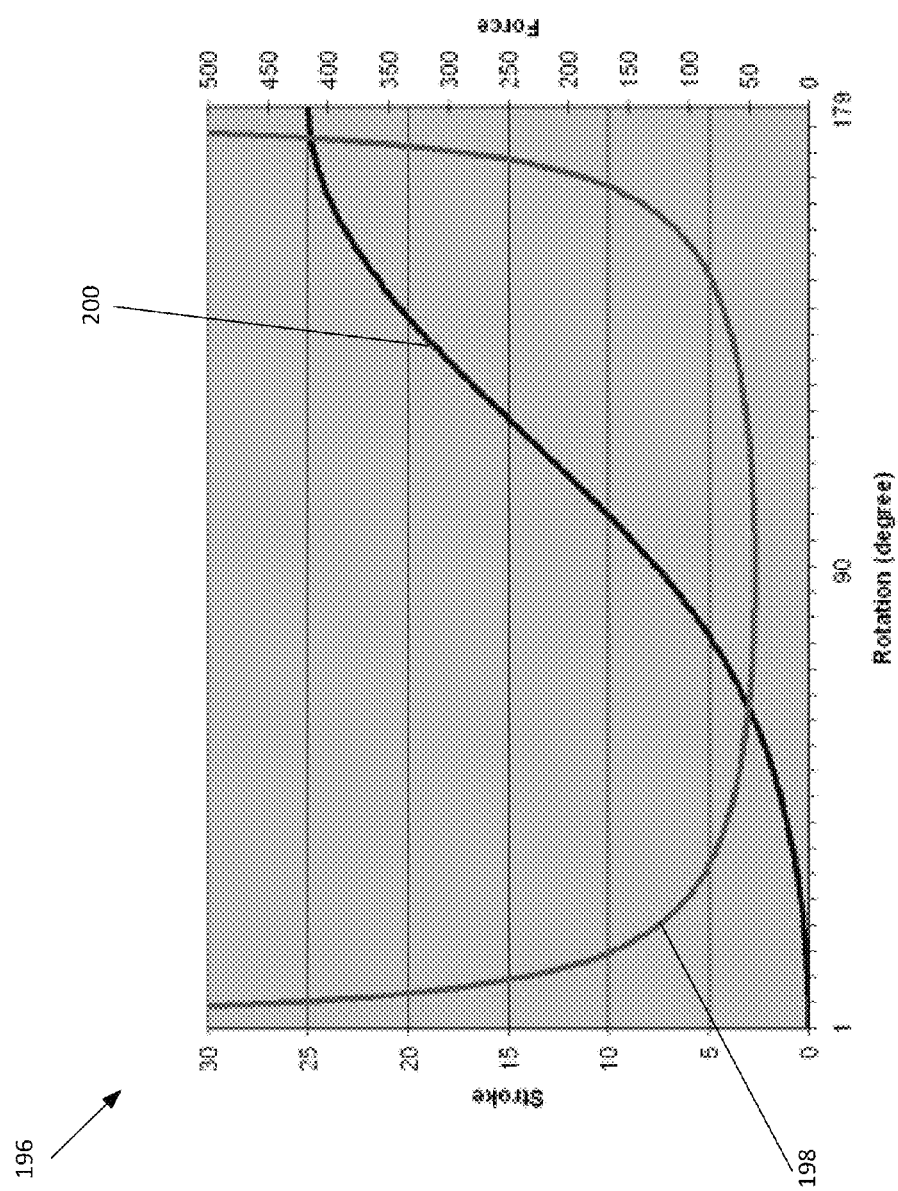
FIG. 28 illustrates a stroke and force plot for the crank slide actuator depicted in FIGS. 27a and 27b according to some aspects of the invention.

Still further, crank slide actuator 182 may provide a desirable force profile along the stroke of air deflector 32 for extending and/or retracting air deflector 32. This may be more readily understood with reference to FIG. 28. FIG. 28 illustrates a stroke and force plot 196 according to some embodiments of crank slide actuator 182. For example, force curve 198 depicts a force exerted on air deflector 32 as a function of rotation angle of the motor 190/crank arms 186, and stroke plot 200 depicts displacement of air deflector 32 as a function of rotation angle of the motor 190/crank arms 186. As seen, the change in stroke (e.g., displacement) of air deflector 32 is less per degree of rotation near 0 degrees of rotation (corresponding to a retracted position) and 180 degrees of rotation (corresponding to an extended position) than, e.g., near 90 degrees of rotation. Further, the force acting on air deflector 32 is greatest near 0 degrees of rotation and 180 degrees of rotation. Thus, according to some embodiments, of crank slide actuator 182 may provide a greater force to air deflector 32 at the beginning (e.g., retraction position) and end (e.g., extended position) of the air deflector's 32 stroke, and may cause more displacement of air deflector 32 per degree of motor 190 rotation in the middle of air deflector's 32 stroke. Such a force profile may be beneficial in order to, e.g., break ice covering an opening of air deflector 32, etc.

According to some aspects, a deformable shape actuator 202 may be used to actuate one or more load management devices 28 as depicted in FIGS. 29a-29d. In some embodiments, deformable shape actuator 202 may comprise an actuator body 204, a deformable deflector 208, and connecting links 206 coupling actuator body 204 to deformable deflector 208. Actuator body 204 may further comprise, e.g., one or more of the actuators or components of one more actuators described herein. For example, in some embodiments actuator body 204 may comprise, e.g., one or more crank arms 212 connected to a motor 210 similar to the one or more crank arms 186 connected to motor 190 as discussed in connection with respect to FIGS. 27a-27b. In such embodiments, actuator body 204 may function similar to crank slide actuator 182 as discussed, however, connecting links 206 may be coupled to deformable deflector 208 (rather than pivotally coupled to air deflector 32 in the manner discussed with respect to crank slide actuator 182).

Figure 29B:
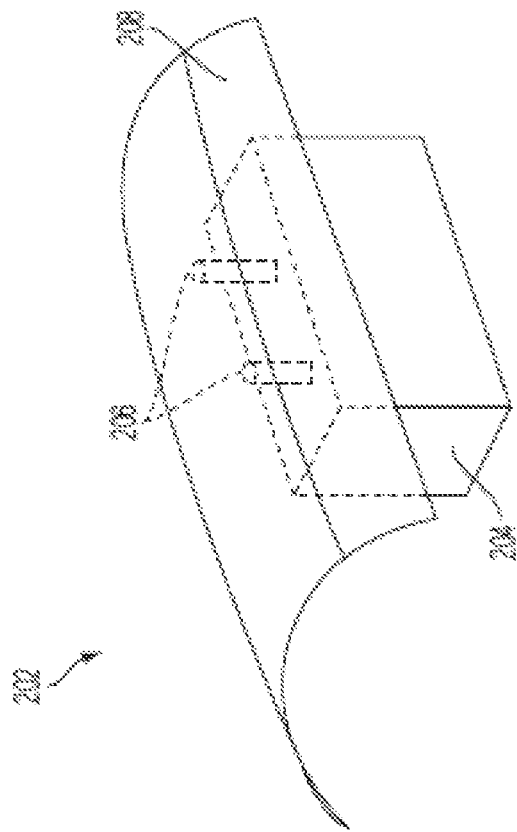
Figure 29A:
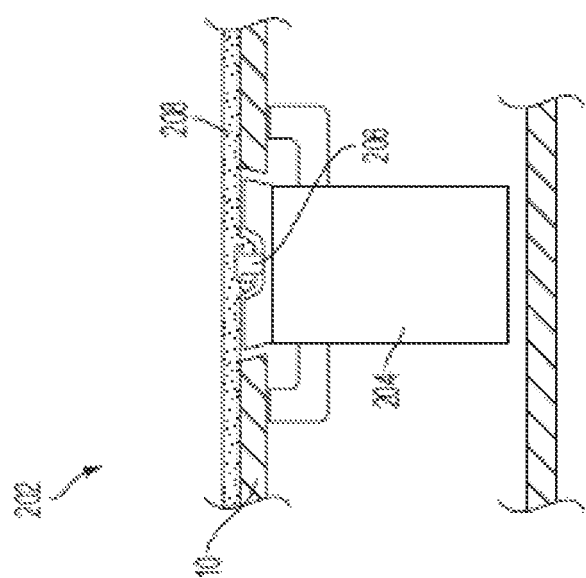
FIG. 29a is a side view of a deformable shape actuator configured to actuate one or more load management devices according to some aspects of the invention.
Figure 29D:
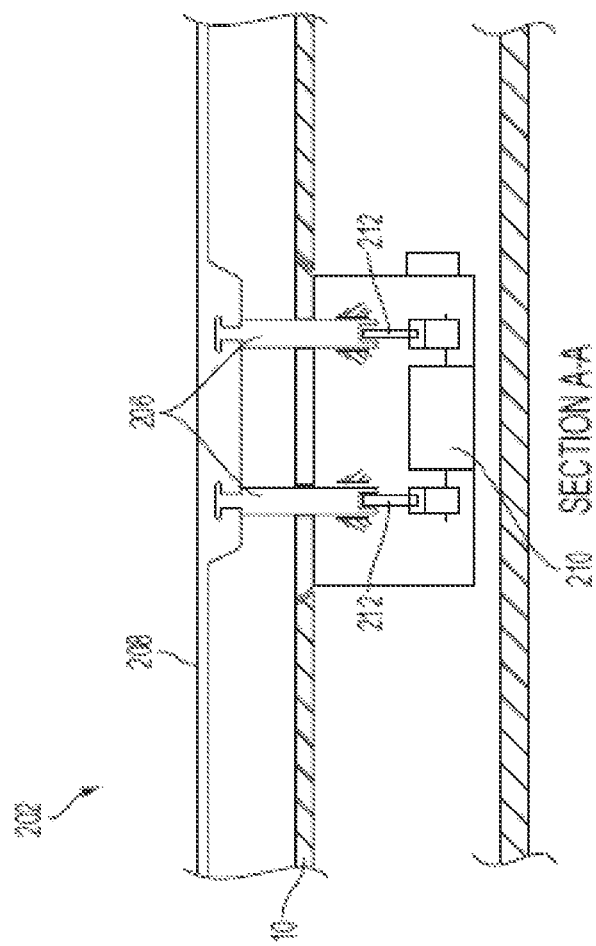
FIG. 29d is a front view of the deformable shape actuator depicted in FIGS. 29a-29c along the line AA depicted in FIG. 29c.
Figure 29C:
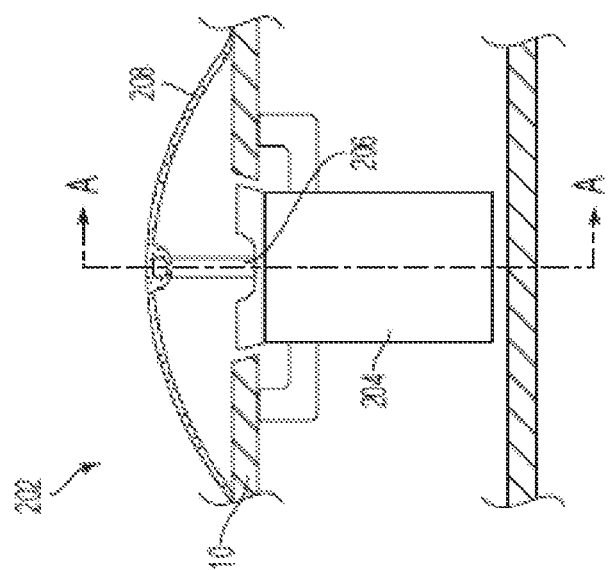
FIG. 29c is a side view of the deformable shape actuator depicted in FIGS. 29a-29b.

In operation, actuator body 204 may be configured to move between a first (e.g., retracted) state as depicted in FIG. 29a, and a second (e.g., extended) state as depicted in FIGS. 29b, 29c, and 29d. Deformable deflector 208 may seamlessly form a portion of the surface of blade 10 (e.g., high pressure side 24 or low pressure side 26) such that in each state there are no exposed openings in blade 10. For example, and as depicted in FIG. 29a, when actuator body 204 (and accordingly deformable deflector 208) is in the first (e.g., retracted) state, deformable deflector 208 may not obstruct air flow along blade 10 (e.g., may not affect lift). However, and as depicted in FIGS. 29b, 29c, and 29d, when actuator body 204 moves to a second (e.g., extended) state, connecting links 206 may extend causing deformable deflector 208 to deform (and thus extend) with the edges thereof, e.g., sealed or otherwise affixed to blade 10. Accordingly, in this second (e.g., extended) state, deformable deflector 208 may obstruct air flow along blade 10 (e.g., destroy lift) without providing an exposed opening or the like in blade 10. Deformable deflector 208 may be made of any suitable material configured to move (e.g., deform) between the first state and the second state, and in some embodiments may be, e.g., a stainless steel sheet or the like.

As discussed, in some embodiments actuator body 204 may comprise one or more components similar to those provided in, e.g., crank slide actuator 182. This may be more fully appreciated with reference to FIGS. 29c and 29d. FIG. 29c illustrates a side view of deformable shape actuator 202 according to some aspects. FIG. 29d illustrates a front view of deformable shape actuator 202 along line AA as depicted in FIG. 29c. As illustrated, actuator body 204 may comprise motor 210 and one or more crank arms 212 pivotally coupled to the one or more connecting links 206. In this regard, actuator body 204 may comprise components similar to crank slide actuator 182 discussed in connection with FIGS. 27a and 27b. Accordingly, motor 210, crank arms 212, and connecting links 206 may operate in a similar manner as motor 190, crank arms 186, and connecting links 184, respectively. Thus, in operation, deformable shape actuator 202 may actuate (e.g., extend and retract) deformable deflector 208 in a similar manner to that of crank slide actuator 182 actuating (e.g., extending and retracting) air deflector 32 as discussed. It will be appreciated by one skilled in the art, given the benefit of this disclosure, that in other embodiments actuator body 204 may comprise components from, e.g., any of the other actuators discussed herein without departing from the scope of this disclosure.

Deformable shape actuator 202 may provide one or more of the benefits discussed herein when used on, e.g., a blade 10 of wind turbine 2. For example, and as illustrated in FIG. 29b, an actuator body 204 of deformable shape actuator 202 may be relatively compact and/or lightweight. That is, actuator body 204 may comprise a smaller width and/or length dimension than deformable deflector 208 and thus be suitable for mounting in a variety of mounting locations. Further, deformable deflector 208 may be relatively lightweight providing for fast actuation times. And because deformable deflector 208 may conform to blade 10 in an airtight or nearly airtight manner, deformable shape actuator 202 may comprise relatively few parts (e.g., a seal around an opening for a load management device 28 or the like is not needed) and may be less vulnerable to, e.g., moisture or other contamination.

Although not described in detail with respect to any of the discussed embodiments, any of the actuation mechanisms described herein may be configured to actuate a load management device 28 to variable heights. For example, with respect to pneumatic systems, multiple pneumatic pistons of varying lengths may be incorporated into each of the described actuators. Accordingly, an appropriately sized pneumatic piston may be actuated depending on a desired extension height of the load management device 28. In other embodiments, where an electrical motor is utilized, a stepper motor or other motor may be utilized and programmed to, e.g., stop at variable heights, etc.

Further, one or more of the above actuators may be combined on a single wind turbine 2 and/or wind turbine blade 10 without departing from the scope of the invention. For example, and returning to FIG. 7, a wind turbine 2 and/or wind turbine blade 10 comprising multiple air deflectors 32 (e.g., air deflectors 32a-32i) may employ one of the discussed actuators to actuate one or more inboard air deflectors 32 (e.g., air deflectors 32 disposed near root 35) while employing a different one of the discussed actuators to actuate one of more outboard air deflectors 32 (e.g., air deflectors 32 disposed near tip 37). Accordingly, an appropriate actuator may be chosen according to, e.g., space constraints, required force/speed, etc., for a particular spanwise location of a corresponding air deflector 32.

In some embodiments, a shape of load management device 28 and/or air deflector 32 used in any actuator may vary from those depicted without departing from the scope of the disclosure. For example, in some embodiments a leading edge (e.g., extended edge) of a load management device 28 or air deflector 32 used in any of the above actuators may be e.g., rounded, angled, etc., without departing from the scope of this disclosure. In other embodiments, a deformable shape deflector (such as, e.g., deformable deflector 208 depicted in FIGS. 29a-29d) may be replace any of the load management devices 28 and/or air deflectors 32 depicted with respect to the discussed actuators. Any other desired shape and/or configuration of load management device 28 and/or air deflector 32 may be provided to any of the discussed actuators without departing from the scope of this disclosure.

The methods and features recited herein may further be implemented through any number of computer readable media that are able to store computer readable instructions. Examples of computer readable mediums that may be used include RAM, ROM, EEPROM, flash memory, or other memory technology, CD-ROM, DVD or other optical disk storage, magnetic cassettes, magnetic tape, magnetic storage and the like.

While illustrative systems and methods as described herein embodying various aspects of the present invention are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. An actuator for actuating a load management device on a blade of a wind turbine comprising:
   a motor;
   one or more crank arms coupled to the motor at a first end of the one or more crank arms; and
   one or more connecting links, wherein a first end of the one or more connecting links is pivotally coupled to a second end of the one or more crank arms, and wherein a second end of the one or more connecting links is pivotally coupled to the load management device,
   wherein when the motor turns in a first direction the load management device is configured to extend from a blade of a wind turbine, and wherein when the motor turns in a second direction opposite the first direction the load management device is configured to retract into the blade of the wind turbine, wherein the motor is configured to turn from a first position to a second position, wherein the first position corresponds to a retracted position of the load management device, and wherein the second position corresponds to an extended position of the load management device, and wherein the one or more crank arms extend lengthwise in a direction parallel to a surface of the load management device when the motor is in the first position and when the motor is in the second position.

2. The actuator of claim 1 further comprising one or more tracks extending in a direction in which the load management device is configured to extend and retract, wherein the load management device is slidably coupled to the one or more tracks.

3. The actuator of claim 1, wherein when the motor turns from the first position to the second position, a shaft of the motor rotates 180 degrees.

4. The actuator of claim 1, wherein when the motor is in the first position a majority of the one or more crank arms is disposed below a shaft of the motor.

5. The actuator of claim 1, wherein when the motor is in the second position a majority of the one or more crank arms is disposed above a shaft of the motor.

6. The actuator of claim 1, wherein the one or more connecting links comprises an angled portion having a vertex, and wherein when the motor is in the first position, the vertex abuts a location of the of the one or more crank arms where the first end of the one or more crank arms is coupled to the motor.

7. The actuator of claim 1, wherein a force transferred from the motor to the load management device when the motor moves to the second position is greater when the motor begins in the first position than when the motor halfway between the first position and the second position.

8. The actuator of claim 1, wherein a force transferred from the motor to the load management device when the motor moves to the first position is greater when the motor begins in the second position than when the motor begins halfway between the second position and the first position.

9. The actuator of claim 1, wherein the one or more connecting links extend lengthwise in a direction parallel to a surface of the load management device when the motor is in the first position and when the motor is in the second position.

10. The actuator of claim 1, wherein the load management device is positioned on a mid-chord location of the blade.

11. A wind turbine comprising:
a hub; and
a plurality of wind turbine blades connected to and arranged about the hub, wherein at least one wind turbine blade of the plurality of wind turbine blades comprises an actuator for actuating an air deflector on the at least one wind turbine blade, wherein the actuator comprises:
a motor;
one or more crank arms coupled to the motor at a first end of the one or more crank arms; and
one or more connecting links, wherein a first end of the one or more connecting links is pivotally coupled to a second end of the one or more crank arms, and wherein a second end of the one or more connecting links is pivotally coupled to the air deflector, wherein when the motor turns in a first direction the air deflector is configured to extend from the at least one wind turbine blade, and wherein when the motor turns in a second direction opposite the first direction the air deflector is configured to retract into the at least one wind turbine blade, wherein the motor is configured to turn from a first position to a second position, wherein the first position corresponds to a retracted position of the air deflector, and wherein the second position corresponds to an extended position of the air deflector, and wherein the one or more crank arms extend lengthwise in a direction parallel a surface of the air deflector when the motor is in the first position and when the motor is in the second position.

12. The wind turbine of claim 11, wherein the actuator further comprises one or more tracks extending in a direction in which the air deflector is configured to extend and retract, wherein the air deflector is slidably coupled to the one or more tracks.

13. The wind turbine of claim 11, wherein when the motor turns from the first position to the second position, a shaft of the motor rotates 180 degrees.

14. The wind turbine of claim 11, wherein when the motor is in the first position a majority of the one or more crank arms is disposed below a shaft of the motor.

15. The wind turbine of claim 11, wherein when the motor is in the second position a majority of the one or more crank arms is disposed above a shaft of the motor.

16. The wind turbine of claim 11, wherein the one or more connecting links comprises an angled portion having a vertex, and wherein when the motor is in the first position, the vertex abuts a location of the one or more crank arms where the first end of the one or more crank arms is coupled to the motor.

17. The wind turbine of claim 11, wherein a force transferred from the motor to the air deflector when the motor moves to the second position is greater when the motor begins in the first position than when the motor begins halfway between the first position and the second position.

18. The wind turbine of claim 11, wherein a force transferred from the motor to the air deflector when the motor moves to the first position is greater when the motor begins in the second position than when the motor begins halfway between the second position and the first position.

19. The wind turbine of claim 11, wherein the one or more connecting links extend lengthwise in a direction parallel to a surface of the air deflector when the motor is in the first position and when the motor is in the second position.

20. The wind turbine of claim 11, wherein the air deflector is positioned on a mid-chord location of the at least one wind turbine blade.

* * * * *